(12) United States Patent
Liu et al.

(10) Patent No.: US 12,689,464 B2
(45) Date of Patent: Jul. 21, 2026

(54) BIT INTERLEAVING OF MODULATION SYMBOL MAPPING FOR DATA CARRYING REFERENCE SIGNALS

(71) Applicant: QUALCOMM Incorporated, San Diego, CA (US)

(72) Inventors: Chih-Hao Liu, San Diego, CA (US); Jing Sun, San Diego, CA (US); Morteza Soltani, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 18/955,768

(22) Filed: Nov. 21, 2024

(65) Prior Publication Data

US 2026/0142745 A1 May 21, 2026

(51) Int. Cl.
*H04L 1/00* (2006.01)
*H04L 5/00* (2006.01)
*H04L 27/34* (2006.01)

(52) U.S. Cl.
CPC .......... *H04L 1/0003* (2013.01); *H04L 1/0071* (2013.01); *H04L 5/0048* (2013.01); *H04L 27/3472* (2013.01)

(58) Field of Classification Search
CPC ... H04L 1/0003; H04L 1/0071; H04L 5/0048; H04L 27/3472
See application file for complete search history.

(56) References Cited

U.S. PATENT DOCUMENTS

| | | | |
|---|---|---|---|
| 11,387,932 B2 | 7/2022 | Khoshnevisan et al. | |
| RE49,301 E * | 11/2022 | Suh ....................... H04L 1/0042 | |
| 11,621,819 B2 | 4/2023 | Nam et al. | |
| 2011/0206164 A1* | 8/2011 | Golitschek Edler Von Elbwart ................. H04L 27/34 375/320 | |
| 2018/0083824 A1 | 3/2018 | Yang et al. | |

(Continued)

OTHER PUBLICATIONS

S. Y. Le Goff, "Signal constellations for bit-interleaved coded modulation," in IEEE Transactions on Information Theory, vol. 49, No. 1, pp. 307-313, Jan. 2003 (Year: 2003).*

(Continued)

*Primary Examiner* — Cynthia Britt
(74) *Attorney, Agent, or Firm* — Holland & Hart LLP

(57) ABSTRACT

Methods, systems, and devices for wireless communications are described. Techniques described herein support encoding and transmitting of data carrying reference signals (DCRSs according to a lower modulation order and data according to a higher modulation order. A transmitting device may write data bits and DCRS bits into a bitstream according to an interleaving table (e.g., a systematic bit priority mapping (SBPM) interleaver or table). In some examples, the transmitting device may utilize a sub-constellation of the higher modulation order constellation for transmitting the DCRS bits via DCRS REs. In some examples, the transmitting device may skip (e.g., leave unoccupied) entries in the interleaving table corresponding to the LSBs of a DCRS column. In some examples, the transmitting device may write DCRS bits into the bitstream according to a first interleaving table, and may write data bits into the bitstream according to a second interleaving table.

23 Claims, 16 Drawing Sheets

(56) References Cited

U.S. PATENT DOCUMENTS

2020/0099400 A1\*  3/2020  Robert Safavi ..... H03M 13/271
2021/0288752 A1\*  9/2021  Suh ....................... H04L 1/0003

OTHER PUBLICATIONS

Y. Liao, M. Qiu and J. Yuan, "Design and Analysis of Delayed
Bit-Interleaved Coded Modulation With LDPC Codes," in IEEE
Transactions on Communications, vol. 69, No. 6, pp. 3556-3571,
Jun. 2021 (Year: 2021).\*
International Search Report and Written Opinion—PCT/US2025/
055632—ISA/EPO—Mar. 12, 2026.

\* cited by examiner

Data Bits 520

DCRS Bits 525

Skipped Entries 530

Data Bits 620

DCRS Bits 625

600

115-b 105-b

Control Signaling

705

710 — Generate First Plurality Of Bits And Second Plurality Of Bits

715 — Write Bitstream

720 — Map Bits To Constellation Points

725 — Bitstream

Read Bitstream — 730

700

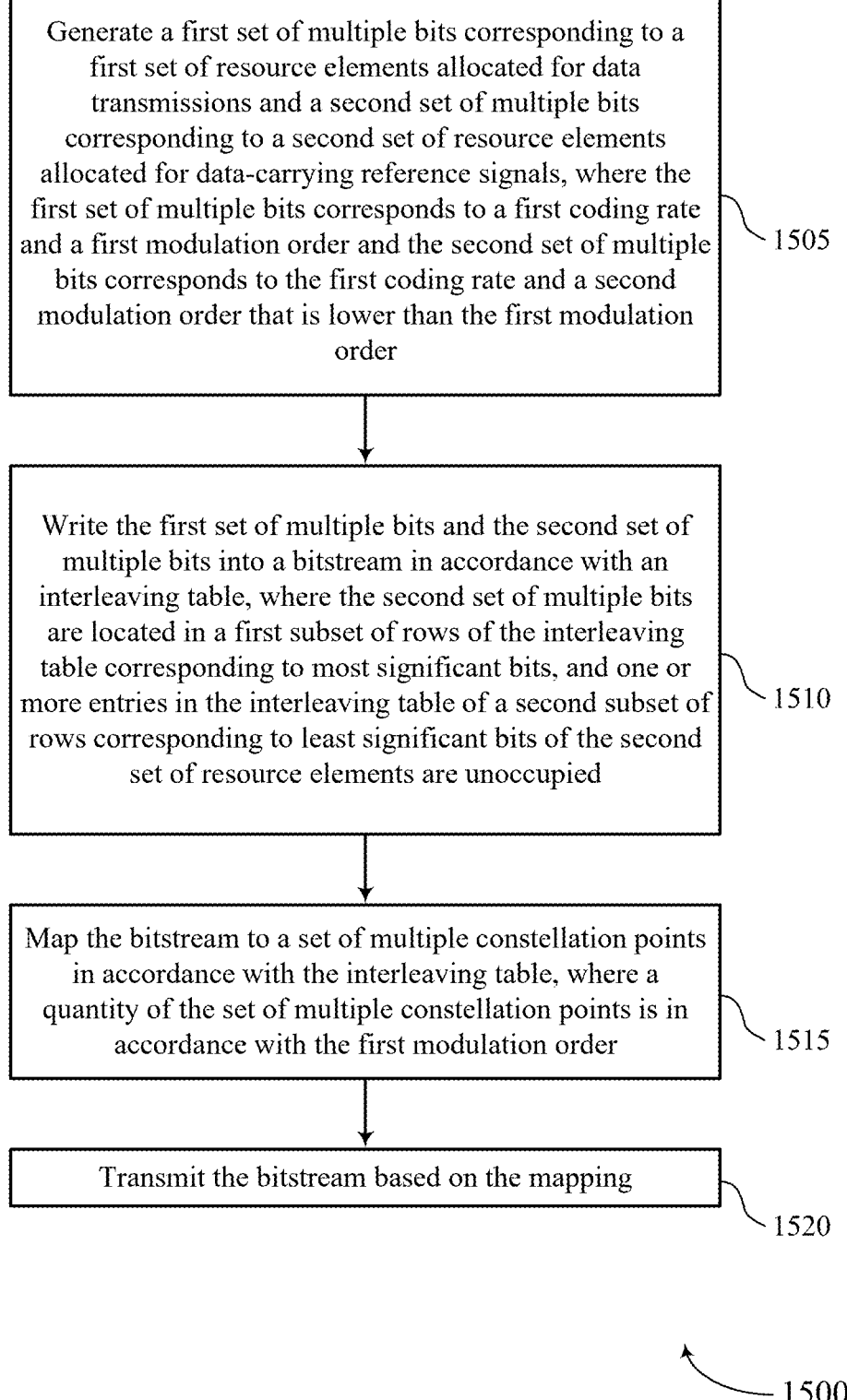

Generate a first set of multiple bits corresponding to a first set of resource elements allocated for data transmissions and a second set of multiple bits corresponding to a second set of resource elements allocated for data-carrying reference signals, where the first set of multiple bits corresponds to a first coding rate and a first modulation order and the second set of multiple bits corresponds to the first coding rate and a second modulation order that is lower than the first modulation order

1505

Write the first set of multiple bits and the second set of multiple bits into a bitstream in accordance with an interleaving table, where the second set of multiple bits are located in a first subset of rows of the interleaving table corresponding to most significant bits, and one or more entries in the interleaving table of a second subset of rows corresponding to least significant bits of the second set of resource elements are unoccupied

1510

Map the bitstream to a set of multiple constellation points in accordance with the interleaving table, where a quantity of the set of multiple constellation points is in accordance with the first modulation order

1515

Transmit the bitstream based on the mapping

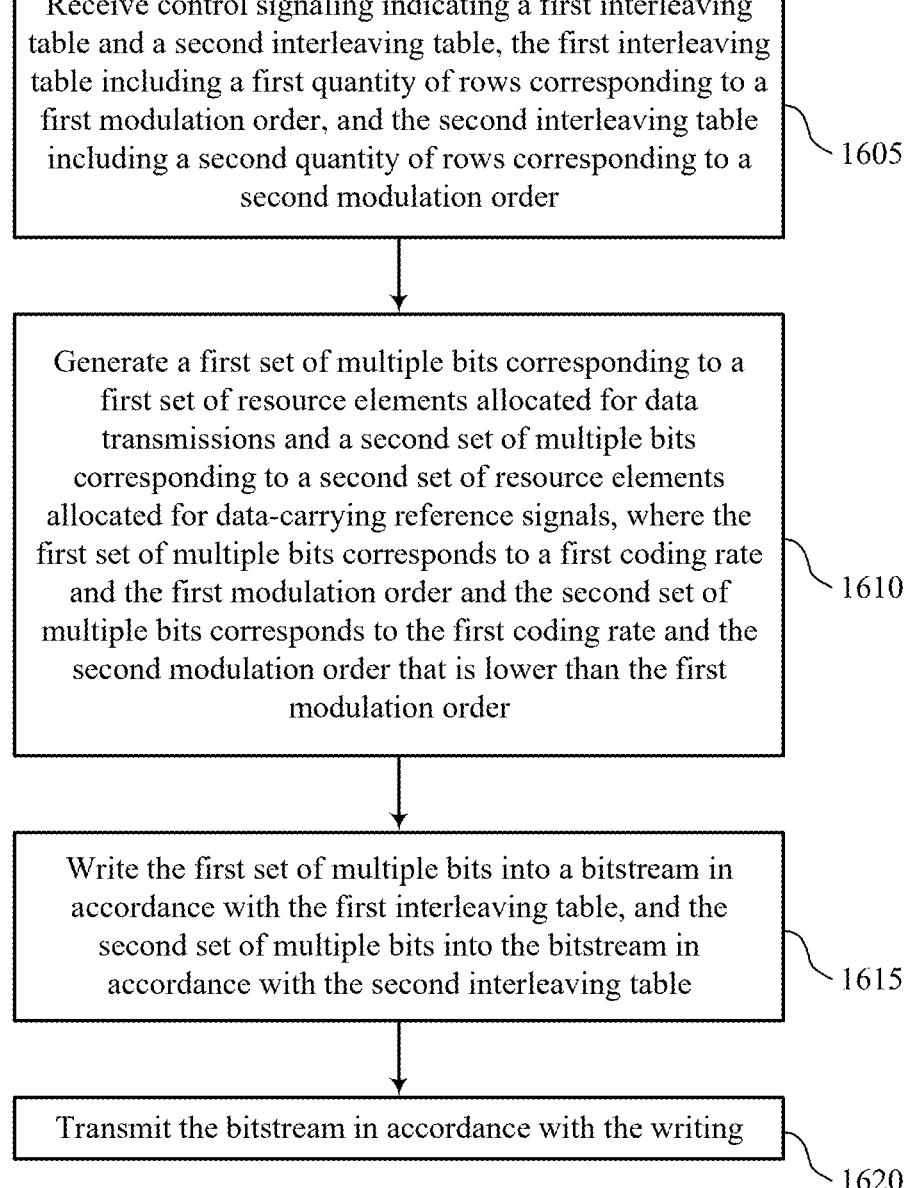

Receive control signaling indicating a first interleaving table and a second interleaving table, the first interleaving table including a first quantity of rows corresponding to a first modulation order, and the second interleaving table including a second quantity of rows corresponding to a second modulation order

1605

Generate a first set of multiple bits corresponding to a first set of resource elements allocated for data transmissions and a second set of multiple bits corresponding to a second set of resource elements allocated for data-carrying reference signals, where the first set of multiple bits corresponds to a first coding rate and the first modulation order and the second set of multiple bits corresponds to the first coding rate and the second modulation order that is lower than the first modulation order

1610

Write the first set of multiple bits into a bitstream in accordance with the first interleaving table, and the second set of multiple bits into the bitstream in accordance with the second interleaving table

1615

Transmit the bitstream in accordance with the writing

BIT INTERLEAVING OF MODULATION SYMBOL MAPPING FOR DATA CARRYING REFERENCE SIGNALS

FIELD OF TECHNOLOGY

The following relates to wireless communications, including bit interleaving of modulation symbol mapping for data carrying reference signals (DCRSs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

A method for wireless communications by a wireless device is described. The method may include generating a set of bits including a first set of multiple bits corresponding to a first set of resource elements allocated for data transmissions and a second set of multiple bits corresponding to a second set of resource elements allocated for data carrying reference signals (DCRSs), where the first set of multiple bits corresponds to a first coding rate and a first modulation order and the second set of multiple bits corresponds to the first coding rate and a second modulation order that is lower than the first modulation order, writing the set of bits including the first set of multiple bits and the second set of multiple bits into a bitstream in accordance with an interleaving table, where one or more most significant bits are located in a first subset of rows of the interleaving table and one or more less significant bits are located in a second subset of rows of the interleaving table, mapping the first set of multiple bits of the bitstream to a set of multiple constellation points and the second set of multiple bits of the bitstream to a subset of the set of multiple constellation points in accordance with the interleaving table, where a quantity of the set of multiple constellation points is in accordance with the first modulation order, and a quantity of the subset of the set of multiple constellation points is in accordance with the second modulation order, and transmitting the bitstream based on the mapping.

A wireless device for wireless communications is described. The wireless device may include one or more memories storing processor executable code, and one or more processors coupled with the one or more memories. The one or more processors may individually or collectively be operable to execute the code to cause the wireless device to generate a set of bits including a first set of multiple bits corresponding to a first set of resource elements allocated for data transmissions and a second set of multiple bits corresponding to a second set of resource elements allocated for DCRSs, where the first set of multiple bits corresponds to a first coding rate and a first modulation order and the second set of multiple bits corresponds to the first coding rate and a second modulation order that is lower than the first modulation order, write the set of bits including the first set of multiple bits and the second set of multiple bits into a bitstream in accordance with an interleaving table, where one or more most significant bits are located in a first subset of rows of the interleaving table and one or more less significant bits are located in a second subset of rows of the interleaving table, map the first set of multiple bits of the bitstream to a set of multiple constellation points and the second set of multiple bits of the bitstream to a subset of the set of multiple constellation points in accordance with the interleaving table, where a quantity of the set of multiple constellation points is in accordance with the first modulation order, and a quantity of the subset of the set of multiple constellation points is in accordance with the second modulation order, and transmit the bitstream based on the mapping.

Another wireless device for wireless communications is described. The wireless device may include means for generating a set of bits including a first set of multiple bits corresponding to a first set of resource elements allocated for data transmissions and a second set of multiple bits corresponding to a second set of resource elements allocated for DCRSs, where the first set of multiple bits corresponds to a first coding rate and a first modulation order and the second set of multiple bits corresponds to the first coding rate and a second modulation order that is lower than the first modulation order, means for writing the set of bits including the first set of multiple bits and the second set of multiple bits into a bitstream in accordance with an interleaving table, where one or more most significant bits are located in a first subset of rows of the interleaving table and one or more less significant bits are located in a second subset of rows of the interleaving table, means for mapping the first set of multiple bits of the bitstream to a set of multiple constellation points and the second set of multiple bits of the bitstream to a subset of the set of multiple constellation points in accordance with the interleaving table, where a quantity of the set of multiple constellation points is in accordance with the first modulation order, and a quantity of the subset of the set of multiple constellation points is in accordance with the second modulation order, and means for transmitting the bitstream based on the mapping.

A non-transitory computer-readable medium storing code for wireless communications is described. The code may include instructions executable by one or more processors to generate a set of bits including a first set of multiple bits corresponding to a first set of resource elements allocated for data transmissions and a second set of multiple bits corresponding to a second set of resource elements allocated for DCRSs, where the first set of multiple bits corresponds to a first coding rate and a first modulation order and the second set of multiple bits corresponds to the first coding rate and a second modulation order that is lower than the first modulation order, write the set of bits including the first set of multiple bits and the second set of multiple bits into a bitstream in accordance with an interleaving table, where one or more most significant bits are located in a first subset of rows of the interleaving table and one or more less significant bits are located in a second subset of rows of the interleaving table, map the first set of multiple bits of the bitstream to a set of multiple constellation points and the second set of multiple bits of the bitstream to a subset of the set of multiple constellation points in accordance with the interleaving table, where a quantity of the set of multiple constellation points is in accordance with the first modulation order, and a quantity of the subset of the set of multiple constellation points is in accordance with the second modulation order, and transmit the bitstream based on the mapping.

Some examples of the method, wireless devices, and non-transitory computer-readable medium described herein may further include operations, features, means, or instructions for selecting the one or more most significant bits for the second set of resource elements to carry data for the DCRSs and selecting one or more padding bits as the one or more least significant bits for the second set of resource elements, where the one or more padding bits correspond to a threshold Euclidean distance with respect to the subset of the set of multiple constellation points.

Some examples of the method, wireless devices, and non-transitory computer-readable medium described herein may further include operations, features, means, or instructions for selecting the first subset of the set of multiple constellation points from a set of candidate sub-constellations, each sub-constellation of including a respective portion of constellation points of the set of multiple constellation points.

In some examples of the method, wireless devices, and non-transitory computer-readable medium described herein, each sub-constellation corresponding to a subset of the second set of resource elements and selecting the first subset of the set of multiple constellation points may be based on an allocated subset of the second set of resource elements.

Some examples of the method, wireless devices, and non-transitory computer-readable medium described herein may further include operations, features, means, or instructions for receiving control signaling indicating a first sub-constellation of the set of candidate sub-constellations, where selecting the first subset of the set of multiple constellation points may be based on the control signaling.

In some examples of the method, wireless devices, and non-transitory computer-readable medium described herein, each sub-constellation of the set of candidate sub-constellations corresponds to a respective set of padded bits for each DCRS.

In some examples of the method, wireless devices, and non-transitory computer-readable medium described herein, the interleaving table includes a systematic bit priority mapping interleaver.

A method for wireless communications by a wireless device is described. The method may include generating a first set of multiple bits corresponding to a first set of resource elements allocated for data transmissions and a second set of multiple bits corresponding to a second set of resource elements allocated for data-carrying reference signals, where the first set of multiple bits corresponds to a first coding rate and a first modulation order and the second set of multiple bits corresponds to the first coding rate and a second modulation order that is lower than the first modulation order, writing the first set of multiple bits and the second set of multiple bits into a bitstream in accordance with an interleaving table, where the second set of multiple bits are located in a first subset of rows of the interleaving table corresponding to most significant bits, and one or more entries in the interleaving table of a second subset of rows corresponding to least significant bits of the second set of resource elements are unoccupied, mapping the bitstream to a set of multiple constellation points in accordance with the interleaving table, where a quantity of the set of multiple constellation points is in accordance with the first modulation order, and transmitting the bitstream based on the mapping.

A wireless device for wireless communications is described. The wireless device may include one or more memories storing processor executable code, and one or more processors coupled with the one or more memories. The one or more processors may individually or collectively be operable to execute the code to cause the wireless device to generate a first set of multiple bits corresponding to a first set of resource elements allocated for data transmissions and a second set of multiple bits corresponding to a second set of resource elements allocated for data-carrying reference signals, where the first set of multiple bits corresponds to a first coding rate and a first modulation order and the second set of multiple bits corresponds to the first coding rate and a second modulation order that is lower than the first modulation order, write the first set of multiple bits and the second set of multiple bits into a bitstream in accordance with an interleaving table, where the second set of multiple bits are located in a first subset of rows of the interleaving table corresponding to most significant bits, and one or more entries in the interleaving table of a second subset of rows corresponding to least significant bits of the second set of resource elements are unoccupied, map the bitstream to a set of multiple constellation points in accordance with the interleaving table, where a quantity of the set of multiple constellation points is in accordance with the first modulation order, and transmit the bitstream based on the mapping.

Another wireless device for wireless communications is described. The wireless device may include means for generating a first set of multiple bits corresponding to a first set of resource elements allocated for data transmissions and a second set of multiple bits corresponding to a second set of resource elements allocated for data-carrying reference signals, where the first set of multiple bits corresponds to a first coding rate and a first modulation order and the second set of multiple bits corresponds to the first coding rate and a second modulation order that is lower than the first modulation order, means for writing the first set of multiple bits and the second set of multiple bits into a bitstream in accordance with an interleaving table, where the second set of multiple bits are located in a first subset of rows of the interleaving table corresponding to most significant bits, and one or more entries in the interleaving table of a second subset of rows corresponding to least significant bits of the second set of resource elements are unoccupied, means for mapping the bitstream to a set of multiple constellation points in accordance with the interleaving table, where a quantity of the set of multiple constellation points is in accordance with the first modulation order, and means for transmitting the bitstream based on the mapping.

A non-transitory computer-readable medium storing code for wireless communications is described. The code may include instructions executable by one or more processors to generate a first set of multiple bits corresponding to a first set of resource elements allocated for data transmissions and a second set of multiple bits corresponding to a second set of resource elements allocated for data-carrying reference signals, where the first set of multiple bits corresponds to a first coding rate and a first modulation order and the second set of multiple bits corresponds to the first coding rate and a second modulation order that is lower than the first modulation order, write the first set of multiple bits and the second set of multiple bits into a bitstream in accordance with an interleaving table, where the second set of multiple bits are located in a first subset of rows of the interleaving table corresponding to most significant bits, and one or more entries in the interleaving table of a second subset of rows corresponding to least significant bits of the second set of resource elements are unoccupied, map the bitstream to a set of multiple constellation points in accordance with the interleaving table, where a quantity of the set of multiple constellation points is in accordance with the first modulation order, and transmit the bitstream based on the mapping.

In some examples of the method, wireless devices, and non-transitory computer-readable medium described herein, writing the second set of multiple bits into the bitstream may include operations, features, means, or instructions for writing the second set of multiple bits into a first column of the interleaving table, where the first subset of rows corresponding to the most significant bits of the first column may be occupied by the second set of multiple bits, and where the second subset of rows corresponding to the least significant bits of the first column may be unoccupied.

In some examples of the method, wireless devices, and non-transitory computer-readable medium described herein, a quantity of rows of the interleaving table may be equal to the first modulation order.

Some examples of the method, wireless devices, and non-transitory computer-readable medium described herein may further include operations, features, means, or instructions for receiving control signaling including an instruction to write the first set of multiple bits and the second set of multiple bits according to the interleaving table, and to skip one or more entries of the interleaving table corresponding to the least significant bits of the second set of resource elements.

In some examples of the method, wireless devices, and non-transitory computer-readable medium described herein, the interleaving table includes a systematic bit priority mapping interleaver.

A method for wireless communications by a wireless device is described. The method may include receiving control signaling indicating a first interleaving table and a second interleaving table, the first interleaving table including a first quantity of rows corresponding to a first modulation order, and the second interleaving table including a second quantity of rows corresponding to a second modulation order, generating a first set of multiple bits corresponding to a first set of resource elements allocated for data transmissions and a second set of multiple bits corresponding to a second set of resource elements allocated for data-carrying reference signals, where the first set of multiple bits corresponds to a first coding rate and the first modulation order and the second set of multiple bits corresponds to the first coding rate and the second modulation order that is lower than the first modulation order, writing the first set of multiple bits into a bitstream in accordance with the first interleaving table, and the second set of multiple bits into the bitstream in accordance with the second interleaving table, and transmitting the bitstream in accordance with the writing.

A wireless device for wireless communications is described. The wireless device may include one or more memories storing processor executable code, and one or more processors coupled with the one or more memories.

The one or more processors may individually or collectively be operable to execute the code to cause the wireless device to receive control signaling indicating a first interleaving table and a second interleaving table, the first interleaving table including a first quantity of rows corresponding to a first modulation order, and the second interleaving table including a second quantity of rows corresponding to a second modulation order, generate a first set of multiple bits corresponding to a first set of resource elements allocated for data transmissions and a second set of multiple bits corresponding to a second set of resource elements allocated for data-carrying reference signals, where the first set of multiple bits corresponds to a first coding rate and the first modulation order and the second set of multiple bits corresponds to the first coding rate and the second modulation order that is lower than the first modulation order, write the first set of multiple bits into a bitstream in accordance with the first interleaving table, and the second set of multiple bits into the bitstream in accordance with the second interleaving table, and transmit the bitstream in accordance with the writing.

Another wireless device for wireless communications is described. The wireless device may include means for receiving control signaling indicating a first interleaving table and a second interleaving table, the first interleaving table including a first quantity of rows corresponding to a first modulation order, and the second interleaving table including a second quantity of rows corresponding to a second modulation order, means for generating a first set of multiple bits corresponding to a first set of resource elements allocated for data transmissions and a second set of multiple bits corresponding to a second set of resource elements allocated for data-carrying reference signals, where the first set of multiple bits corresponds to a first coding rate and the first modulation order and the second set of multiple bits corresponds to the first coding rate and the second modulation order that is lower than the first modulation order, means for writing the first set of multiple bits into a bitstream in accordance with the first interleaving table, and the second set of multiple bits into the bitstream in accordance with the second interleaving table, and means for transmitting the bitstream in accordance with the writing.

A non-transitory computer-readable medium storing code for wireless communications is described. The code may include instructions executable by one or more processors to receive control signaling indicating a first interleaving table and a second interleaving table, the first interleaving table including a first quantity of rows corresponding to a first modulation order, and the second interleaving table including a second quantity of rows corresponding to a second modulation order, generate a first set of multiple bits corresponding to a first set of resource elements allocated for data transmissions and a second set of multiple bits corresponding to a second set of resource elements allocated for data-carrying reference signals, where the first set of multiple bits corresponds to a first coding rate and the first modulation order and the second set of multiple bits corresponds to the first coding rate and the second modulation order that is lower than the first modulation order, write the first set of multiple bits into a bitstream in accordance with the first interleaving table, and the second set of multiple bits into the bitstream in accordance with the second interleaving table, and transmit the bitstream in accordance with the writing.

Some examples of the method, wireless devices, and non-transitory computer-readable medium described herein may further include operations, features, means, or instructions for mapping the first set of multiple bits of the bitstream to a first set of multiple constellation points in accordance with the first interleaving table, where a quantity of the first set of multiple constellation points may be in accordance with the first modulation order and mapping the second set of multiple bits of the bitstream to a second set of multiple constellation points in accordance with the second interleaving table and the second modulation order, where a quantity of the second set of multiple constellation points may be in accordance with the second modulation order.

Some examples of the method, wireless devices, and non-transitory computer-readable medium described herein may further include operations, features, means, or instructions for transmitting the bitstream may be based on mapping the first set of multiple bits of the bitstream to the first set of multiple constellation points, and mapping the second set of multiple bits of the bitstream to the second set of multiple constellation points.

In some examples of the method, wireless devices, and non-transitory computer-readable medium described herein, the first interleaving table includes a first systematic bit priority mapping interleaver and the second interleaving table includes a second systematic bit priority mapping interleaver.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 14 through 16 show flowcharts illustrating methods that support bit interleaving of modulation symbol mapping for DCRSs in accordance with one or more aspects of the present disclosure.

DETAILED DESCRIPTION

Figure 1:
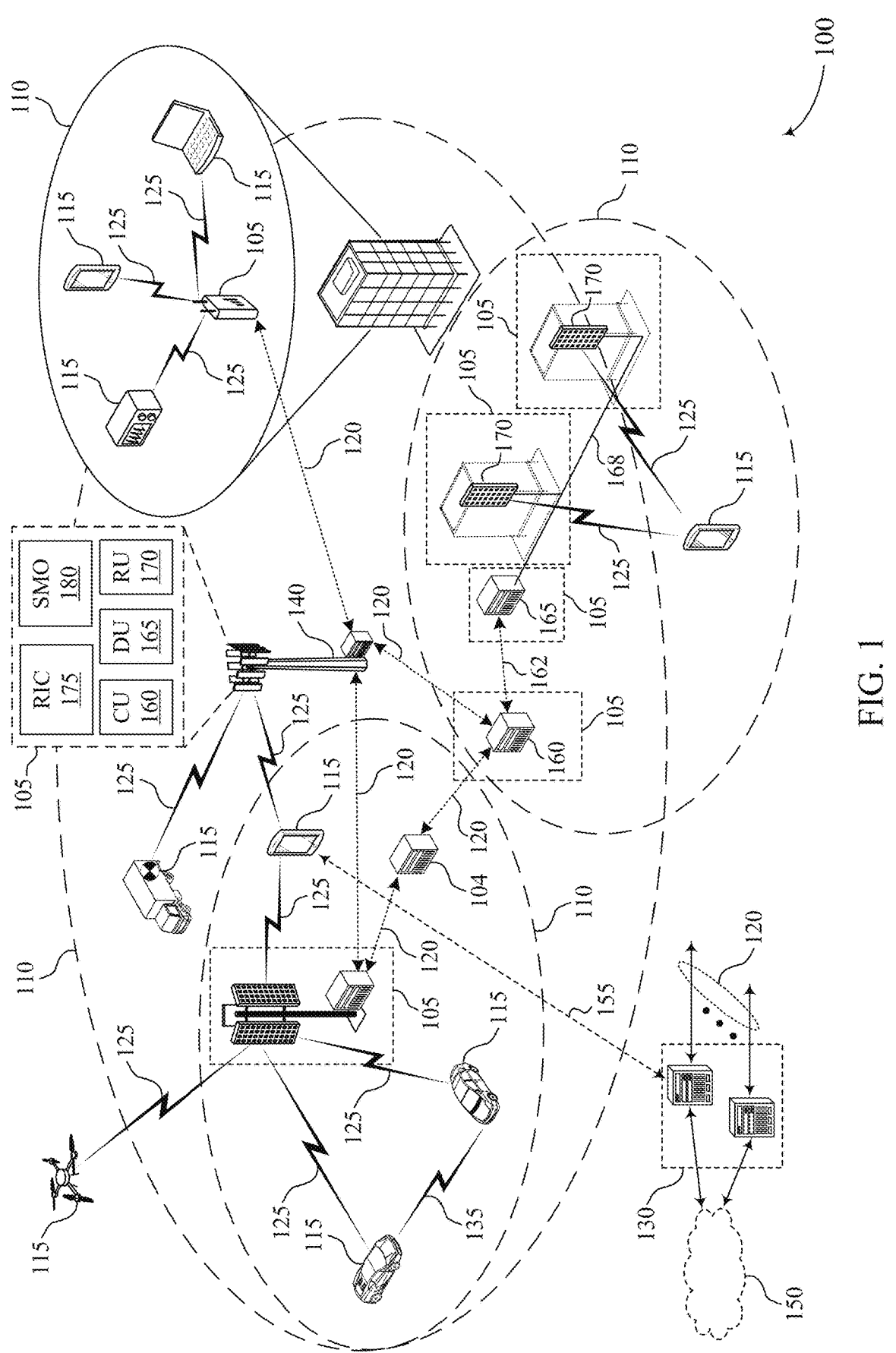
FIG. 1 shows an example of a wireless communications system that supports bit interleaving of modulation symbol mapping for data carrying reference signals (DCRSs) in accordance with one or more aspects of the present disclosure.

In a wireless communications system, a transmitting device may transmit data via a shared channel, and may transmit reference signals which may be utilized by a receiving device to estimate interference. In some cases, a demodulation reference signal (DMRS) may be utilized for channel estimation. However, if DMRSs are transmitted sparsely and bursty interference is experienced, then channel estimation in slot that does not include a DMRS symbol may be inaccurate (e.g., if based on DMRS symbols in a previous slot). In such examples, the transmitting device may transmit data carrying reference signals (DCRSs) via uplink or downlink shared channels. Such DCRSs may be utilized by the receiving device to perform more accurate channel estimation. Similarly, virtual pilot tones may be transmitted in a given slot, and the virtual pilot tones may be utilized (e.g., alone, or in combination with previously transmitted DMRSs) to more accurately determine a channel and receive data transmissions. However, DCRSs (e.g., channel estimation reference signals, virtual pilot reference signals, etc.) may be most useful if they are highly reliable. DCRSs may be transmitted via DCRS resource elements (REs) and data may be transmitted via data REs of an uplink or downlink shared channel. The DCRS REs and the data REs of the shared channel may correspond to a single coding rate. To increase the reliability of DCRSs, DCRSs may be encoded and transmitted according to a lower modulation order than the data. However, such encoding and transmissions may fail, or may be inefficient, without a mechanism to encode, modulate, and transmit a bitstream that includes both low modulation order DCRSs and higher modulation order data.

Techniques described herein support encoding and transmitting of DCRSs according to a lower modulation order and data according to a higher modulation order. In some examples, a transmitting device may write data bits and DCRS bits into a bitstream according to an interleaving table (e.g., a systematic bit priority mapping (SBPM) interleaver or table), where the bits are written in a columns first rows after manner (e.g., one bit in each column is written for an entire row before bits in each column for the second row are written), and may be read in a rows first columns after manner (e.g., bits in each row for a given column are read first, and then bits in each row for the next column are read, etc.). The first (e.g., higher) rows of the interleaving table may correspond to most significant bits (MSBs), and the last (e.g., lower) rows of the interleaving table may correspond to less significant bits (LSBs). In some examples, to modulate and transmit the bitstream according to a single constellation, the transmitting device may utilize a sub-constellation of the higher modulation order constellation for transmitting the DCRS bits via DCRS REs. In such examples, the transmitting device may utilize constellation points that increase a Euclidean distance between constellation points and therefore increase reliability. Additional padded bits (e.g., LSBs) for the DCRS REs may be s elected to further increase the Euclidean distance between constellation points. In some examples, the transmitting device may select a sub-constellation for mapping the DCRS bits from a set of candidate sub-constellations (e.g., resulting in a lower average transmit power).

In some examples, the transmitting device may skip (e.g., leave unoccupied) entries in the interleaving table corresponding to the LSBs of a DCRS column. That is, the MSBs of the DCRS column may be written, and then the LSBs of the DCRS column may be skipped. The reading device may also skip the unoccupied entries in the DCRS column of the interleaving table.

In some examples, the transmitting device may write DCRS bits into the bitstream according to a first interleaving table, and may write data bits into the bitstream according to a second interleaving table. The first interleaving table may have a number of rows corresponding to the higher modulation order of the data REs, and the second interleaving table may have a number of rows corresponding to the lower modulation order of the data REs. The transmitting device may map the DCRS bits first using the second interleaving table, and the transmitting device may map the data bits second, and the receiving device may read the bitstream in the same order.

Aspects of the disclosure are initially described in the context of wireless communications systems. Aspects of the disclosure are further illustrated by and described with reference to wireless communications systems, bit mapping schemes, and process flows. Aspects of the disclosure are further illustrated by and described with reference to apparatus diagrams, system diagrams, and flowcharts that relate to bit interleaving of modulation symbol mapping for DCRSs.

FIG. 1 shows an example of a wireless communications system 100 that supports bit interleaving of modulation symbol mapping for DCRSs in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104. That is, an IAB donor may be referred to as a parent node in communication with one or more child nodes (e.g., an IAB donor may relay transmissions for UEs through other IAB node(s) 104). Additionally, or alternatively, IAB node(s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes, or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support bit interleaving of modulation symbol mapping for DCRSs as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of REs (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IOT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may support synchronous or asynchronous operation. For synchronous operation, network entities 105 (e.g., base stations 140) may have similar frame timings, and transmissions from different network entities (e.g., different ones of the network entities 105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Techniques described herein support encoding and transmitting of DCRSs according to a lower modulation order and data according to a higher modulation order. In some examples, a transmitting device may write data bits and DCRS bits into a bitstream according to an interleaving table (e.g., a SBPM interleaver or table), where the bits are written in a columns first rows after manner (e.g., one bit in each column is written for an entire row before bits in each column for the second row are written), and may be read in a rows first columns after manner (e.g., bits in each row for a given column are read first, and then bits in each row for the next column are read, etc.). The first (e.g., higher) rows of the interleaving table may correspond to MSBs and the last (e.g., lower) rows of the interleaving table may correspond to less significant bits (LSBs). In some examples, to modulate and transmit the bitstream according to a single constellation, the transmitting device may utilize a sub-constellation of the higher modulation order constellation for transmitting the DCRS bits via DCRS REs. In such examples, the transmitting device may utilize constellation points that increase a Euclidean distance between constellation points and therefore increase reliability. Additional padded bits (e.g., LSBs) for the DCRS REs may be s elected to further increase the Euclidean distance between constellation points. In some examples, the transmitting device may select a sub-constellation for mapping the DCRS bits from a set of candidate sub-constellations (e.g., resulting in a lower average transmit power).

In some examples, the transmitting device may skip (e.g., leave unoccupied) entries in the interleaving table corresponding to the LSBs of a DCRS column. That is, the MSBs of the DCRS column may be written, and then the LSBs of the DCRS column may be skipped. The reading device may also skip the unoccupied entries in the DCRS column of the interleaving table.

In some examples, the transmitting device may write DCRS bits into the bitstream according to a first interleaving table, and may write data bits into the bitstream according to a second interleaving table. The first interleaving table may have a number of rows corresponding to the higher modulation order of the data REs, and the second interleaving table may have a number of rows corresponding to the lower modulation order of the data REs. The transmitting device may map the DCRS bits first using the second interleaving table, and the transmitting device may map the data bits second, and the receiving device may read the bitstream in the same order.

Figure 2:
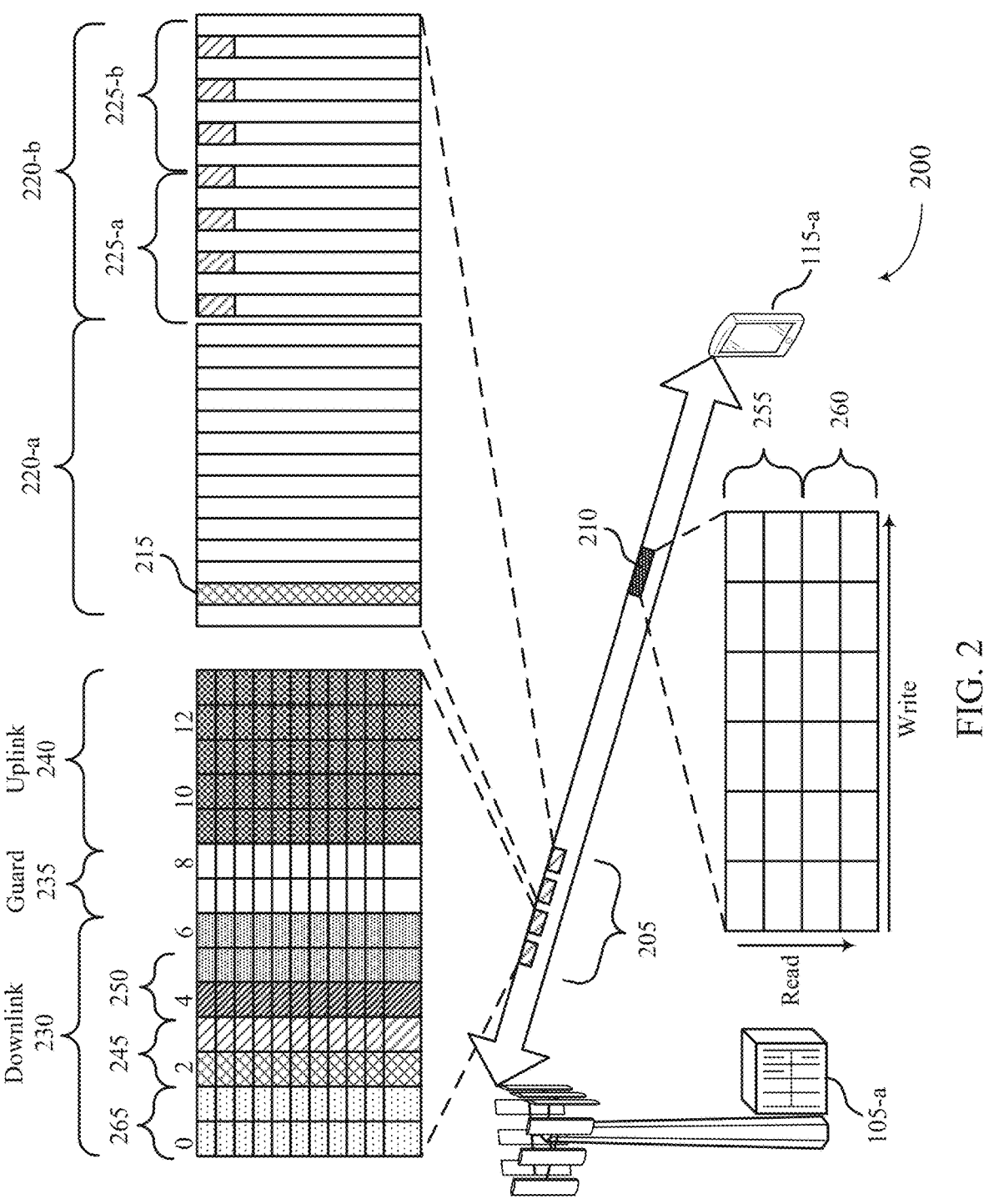
FIG. 2 shows an example of a wireless communications system that supports bit interleaving of modulation symbol mapping for DCRSs in accordance with one or more aspects of the present disclosure.

FIG. 2 shows an example of a wireless communications system 200 that supports bit interleaving of modulation symbol mapping for DCRSs in accordance with one or more aspects of the present disclosure. The wireless communications system 200 may implement, or be implemented by, aspects of the wireless communications system 100. For example, the wireless communications system 200 may include a UE 115-a, and a network entity 105-a, which may be examples of corresponding devices described with reference to FIG. 1.

A wireless device (e.g., the network entity 105-a) may transmit one or more reference signals (e.g., DCRSs 205), and data 210. Another wireless device (e.g., the UE 115-a) may perform one or more measurements on the reference signals, which may be utilized to successfully receive and decode the data 210. Similar techniques may be performed where the UE 115-a transmits the reference signals and the data 210 to the network entity 105-a.

In some examples, DCRSs may be inserted between DMRS symbols to capture bursty interference which occurs during non-DMRS symbols. For example, DMRS time patterns may be sparce in some scenarios (e.g., fluid start and length indicator values (SLIVs), cross SLIV DMRS combining, or sparsely scheduled DMRSs, among other examples). For instance, DMRSs 215 may be located in a first slot 220-a (e.g., a second symbol of a first slot 220-a), and no DMRS symbols may be located in a second slot 220-b. In such examples, the receiving device (e.g., the UE 115-a) may experience interference (e.g., bursty interference) during the second slot 220-b that was not present during the slot 220-a. Measurements taken on the DMRS 215 during the slot 220-a may not be utilized to effectively estimate interference (e.g., Rnn) during the slot 220-b. In some examples, the transmitting device (e.g., the network entity 105-a) may transmit reference signals such as DCRSs 205. DCRSs 205 may be transmitted in accordance with a pattern (e.g., a sparse time and frequency resource pattern).

For example, the network entity 105-a may transmit the DCRSs 205 in every other symbol, and across tones (e.g., one tone in each resource block (RB)). The receiving device (e.g., the UE 115-a) may perform interference estimation (e.g., Rnn estimation). The UE 115-a may perform error estimation during one or more error estimation time windows 225 (e.g., the first error estimation time window 225-a and the second time error estimation time window 225-b in the slot 220-b). For example, on each ith data DCRS resource element (RE), a receiver vector $Y_i$ may be given as $Y_i=H_ix_i+G_iw_i+n_i$, where $H_i$ is a channel estimated from the DMRS 215 or the DORSs, $x_i$ is reconstructed by applying hard slicing on a demapper or a square estimator. The channel estimate $\hat{R}_{NN}$ may be calculated as $$\hat{R}_{NN} = \frac{1}{N}\sum (Y_i - \hat{H}_i\hat{x}_i)(Y_i - \hat{H}_i\hat{x}_i)'.$$

In some examples, to make DCRS reconstruction more reliable, modulation orders for DCRSs 205 may be equal to or less than a modulation order for a scheduled shared channel (e.g., a physical uplink shared channel (PUSCH) if the UE 115-a is the transmitting device sending the DCRSs 205 and the data 210, or a physical downlink shared channel (PDSCH) if the network entity 105-a is the transmitting device sending the DCRSs 205 and the data 210). In such examples, the UE 115-a may generate a bitstream including bits for the DCRSs 205 and the data 210 using a same coding rate. However, a modulation order for the DCRS bits may be different from a modulation order for the data 210.

In some examples, the transmitting device may send virtual pilot reference signals (e.g., DCRSs 205) for channel estimation. Data aided channel estimation may reduce DMRS overhead, and may improve the channel estimation quality for timing varying channels (e.g., Doppler channels). For example, a slot may be referred to as a special slot or a flexible slot, which may a downlink portion 230, a guard portion 235, and an uplink portion 240. The uplink portion 240 may include five uplink symbols (e.g., for a PUSCH). The guard portion 235 may occupy two symbol periods. In some examples, no communications may be scheduled for the guard portion 235 to allow the wireless device(s) to switch from downlink to uplink.

The downlink portion 230 may include a DMRS symbol (e.g., symbol 2 in the downlink portion 230, allocated for DMRSs 215), first downlink data symbols 245, downlink second data symbols 250, and other symbols 265. The first downlink data symbols 245 may include a virtual pilot symbol (e.g., a DCRS 205.

In some examples, the slot is a special slot that includes one front loaded DMRS symbol (e.g., in symbol 2). In some examples, a wireless device may perform channel estimation from the DMRS symbol at symbol 2 to obtain an estimate of the channel. The wireless device may reconstruct the modulation symbol(s) (e.g., QAM modulation symbol(s)) in symbol 4 as one or more virtual pilot tones (utilizing the estimate of the channel from the DMRS symbol at symbol 2).

After performing virtual pilot reconstruction (e.g., QAM constellation reconstruction), the wireless device may have a virtual pilot tone in symbol 4 (similar to the DMRS tone from symbol 2). The virtual pilot tone may be utilized to interpolate the channel for one or more later symbols (e.g., PDSCH symbols 5 and 6). For example, the second data symbols 250 may be demodulated or decoded using data aided channel estimation (DACE). For instance, for channel estimation on virtual pilot symbols, the receiving device may multiple the reconstructed virtual pilot tone with a full duplex received signals to get the channel estimation. Descrambled virtual pilots may be constructed as $$H_{vp} = \frac{1}{\sqrt{TPR}}\left(X^H X + b*I\right)^{-1} \cdot X^H Y,$$

where Y represents a number of REs least squares (LS) times a number of receiver corresponding to input frequency domain symbols, and X represents a number of RE LS times a rank corresponding to the reconstructed constellations, and where a number of RE LS is a quantity of REs for averaging and channel is assumed to be constant, and b represents a regularization factor. The quantity of tones may be greater than the rank. While such scenarios are described in terms of downlink data symbols, a similar approach may be utilized to interpolate the channel for one or more uplink symbols (e.g., PUSCH) symbols.

In some approaches, the virtual pilot symbol may have a different modulation scheme (e.g., modulation order, coding scheme, code rate, or MCS, among other examples) than the modulation scheme of the second data symbols 250. For instance, the virtual pilot symbol may have a lower modulation scheme (e.g., lower modulation order, coding scheme, code rate, MCS, or combination thereof) than the modulation scheme of the second data symbols 250. The different (e.g., lower) modulation scheme of the virtual pilot symbol may ensure greater accuracy in channel estimation, which may increase the decoding accuracy of the second data symbols 250. Thus, the transmitting device may generate data bits and DCRS bits according to a same coding rate, but a modulation order for the data bits may be higher than a modulation order for the DCRS bits.

In some examples, the transmitting device may generate a bitstream according to an interleaving table (e.g., an SBPM interleaving). A final step of a rate matching procedure from a code block to one or more modulation symbols may include bit interleaving. For example, the transmitting device may apply a bit interleaving to each code block. The bit interleaving is performed via an SBPM interleaving in which the systematic bits are mapped to most significant bits (MSBs) 255, resulting in better error protection. Coded bits are writing into the interleaving table with a quantity of rows equal to the modulation order in columns first, and rows later (e.g., are written into each column of a first row, then each column of a second row, etc.). After the interleaving, the modulation symbols may be mapped to REs with layers first, frequency second, and then time. MSBs 255 are thus mapped prior to least significant bits (LSBs) 260.

Thus, in the case of virtual pilots, or interference estimation reference signals, among other examples, shared channel code blocks may be rate matched into DCRS REs. However, a modulation order backoff on DCRS REs may be performed to make the DCRS reconstruction sufficiently reliable. DCRSs 205 may provide improved interference estimation while carrying data. However, some signaling techniques may not support different modulation orders in SBPM interleaving.

In some examples, as described herein, a single modulation order (e.g., a single QAM modulation order for QAM modulation) may be utilized, in which case the transmitting device may select a subset of QAM constellation points to ensure reliable DCRS reconstruction (e.g., as described in greater detail with reference to FIGS. 3-4). In some examples, different modulation orders may be applied to the data bits and the DCRS bits, in which case different modulation orders may be supported in the SBPM interleaver (e.g., as described in greater detail with reference to FIGS. 5-6).

Figure 3:
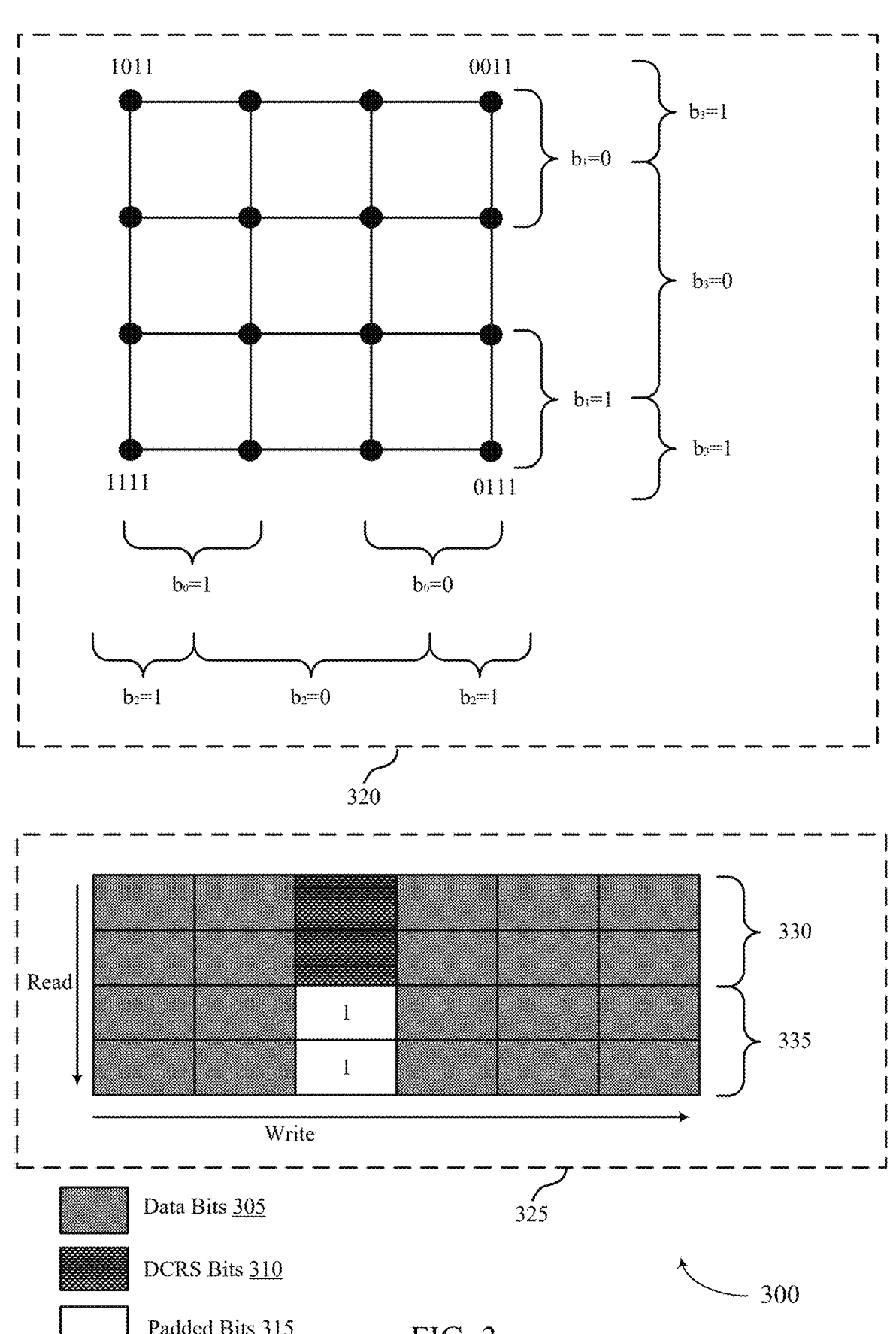
FIG. 3 shows an example of a bit mapping scheme that supports bit interleaving of modulation symbol mapping for DCRSs in accordance with one or more aspects of the present disclosure.

FIG. 3 shows an example of a bit mapping scheme 300 that supports bit interleaving of modulation symbol mapping for DCRSs in accordance with one or more aspects of the present disclosure. The bit mapping scheme 300 may implement, or be implemented by, aspects of the wireless communications system 100, the wireless communications system 200, or both. For example, a transmitting wireless device (e.g., a UE 115, or a network entity 105), and a receiving wireless device (e.g., a UE 115 or a network entity 105), which may be examples of corresponding devices described with reference to FIGS. 1 and 2, may communicate in accordance with the bit mapping scheme 300.

In some examples, as described in greater detail with reference to FIG. 2, a transmitting device may generate a bitstream including data bits 305 (e.g., corresponding to REs of a PUSCH or PDSCH) and DCRS bits 310 (e.g., corresponding to one or more DCRSs). As described herein, the data bits 305 and the DCRS bits 310 may be bits from a same pool of bits, written into a bitstream according to the interleaving table 325. For example, a single pool of bits (e.g., corresponding to a data transmission) may be written and mapped to REs in accordance with the interleaving table 325. Thus, the data bits 305 may indicate bits from a pool of bits that have been mapped to data REs (e.g., of a PDSCH or PUSCH), and the DCRS bits 310 may be bits (e.g., from the same pool of bits) that have been mapped to DCRS REs.

The DCRSs may be mapped to a lower modulation order, and the data signals may be mapped to a higher modulation order (e.g., while both the data bits 305 and the DCRS bits 310 may be generated according to a same coding rate). As described herein, the transmitting device may map the DCRS bits 310 and the data bits 305 in accordance with an interleaving table 325 (e.g., a SBPM interleaver). The transmitting device may map the bitstream horizontally first, and vertically second (e.g., may write the bitstream into the interleaving table 325 such that each bit is mapped to each column of the first row, and then mapped to each column of the second row, etc. A first set of rows may map to MSBs 330, and a second set of rows may map to LSBs 335.

The transmitting device may map the data bits 305 and the DCRS bits 310 to a single constellation 320 for modulation and transmission. The constellation 320 may correspond to the higher modulation order of the data bits 305. In such examples, the interleaving table 325 may also correspond to the higher modulation order (e.g., the quantity of rows in the interleaving table 325 may be equal to the modulation order). For example, the data bits 305 may correspond to a modulation order of 4, and the interleaving table 325 may have four rows (e.g., each column may have four entries). The constellation 320 may be an example of a 16 QAM constellation. Each constellation point of the constellation 320 may correspond to a four bit codepoint ($b_0 b_1 b_2 b_3$) correspond to four bit values written into a column of the interleaving table 325 (e.g., $b_0 b_1$ may be MSBs 330 corresponding to the first two rows of a given column, and $b_2 b_3$ may be LSBs 335 correspond to the last two rows of the same column).

Each column of the interleaving table 325 that includes the DCRS bits 310 may include less bits than data columns because the DCRS REs correspond to a different (e.g., lower) modulation order. Thus, the DCRS REs may correspond to a lower modulation order (e.g., modulation order of two). In such examples, the DCRS bits 310 may only fill two rows (e.g., the MSBs 330). That is, the transmitting device may map the DCRS bits 310 to the MSBs 330 of a given row.

In some examples, the transmitting device may set one or more padded bits 315 (e.g., to complete a column of the higher modulation order interleaving table 325), and may map the DCRS RE entries of the interleaving table 325 to the higher order constellation 320. For example, the transmitting device may set a remainder of entries of the interleaving table 325 for DCRS REs as padded bits 315. The padded bits may be set to a value that increases (e.g., to a threshold or maximum) a Euclidean distance in the data constellation 320. For instance, the constellation points that have the largest Euclidean distance in the constellation 320 are the outside corner constellation points (e.g. 1011, 0011, 1111, and 0111). Thus, the four constellation points for a 16 QAM constellation 320 that have the greatest Euclidean distance each correspond to $b_2=1$ and $b_3=1$. In such examples, the padded bits 315 may each be set to 1. For each set of DCRS bits 310 in a column of the interleaving table 325, the transmitting device may determine to which of the four constellation points (e.g., which quadrant of the constellation 320) to map the DCRS bits 310 in accordance with the bit values of the DCRS bits 310. The transmitting device may also ensure a greater Euclidean distance (e.g., and therefore greater reliability) for each constellation point in accordance with the selected values (e.g., 11) for the padded bits 315.

As described with reference to FIG. 3, for DCRSs (e.g., interference estimation reference signals, or virtual pilot signals, as described in greater detail with reference to FIG. 2), with modulation orders less than the associated PDSCH or PUSCH, the transmitting device may determine a subset of constellation points (e.g., a sub-constellation) in the PUSCH or PDSCH QAM constellation 320, and may therefore maintain the same SBPM structure (e.g., the same interleaving table 325) for both the data bits 305 and the DCRS bits 310. The sub-constellation may refer to the subset of constellation points (e.g., four constellation points $b_1b_2$ 11) of the total available constellation points (e.g., the sixteen constellation points $b_0b_1b_2b_3$). The subset of constellation points may be defined by the selected values of the padded bits 315, which may be selected to increase the Euclidean distance and reliability of the DCRSs. Mapping the DCRS bits 310 into the subset of PDSCH or PUSCH constellation points (e.g., the sub-constellation of the constellation 320) may allow the transmitting device to utilize the same QAM modulation for both the DCRS REs and the PDSCH or PUSCH REs. Similarly, the receiving device may use the same demapper for both the DCRS REs and the PDSCH or PUSCH RES.

In some examples, as described in greater detail with reference to FIG. 4, the transmitting device may select one of multiple candidate sub-constellations for mapping and transmitting the DCRS bits 310.

Figure 4:
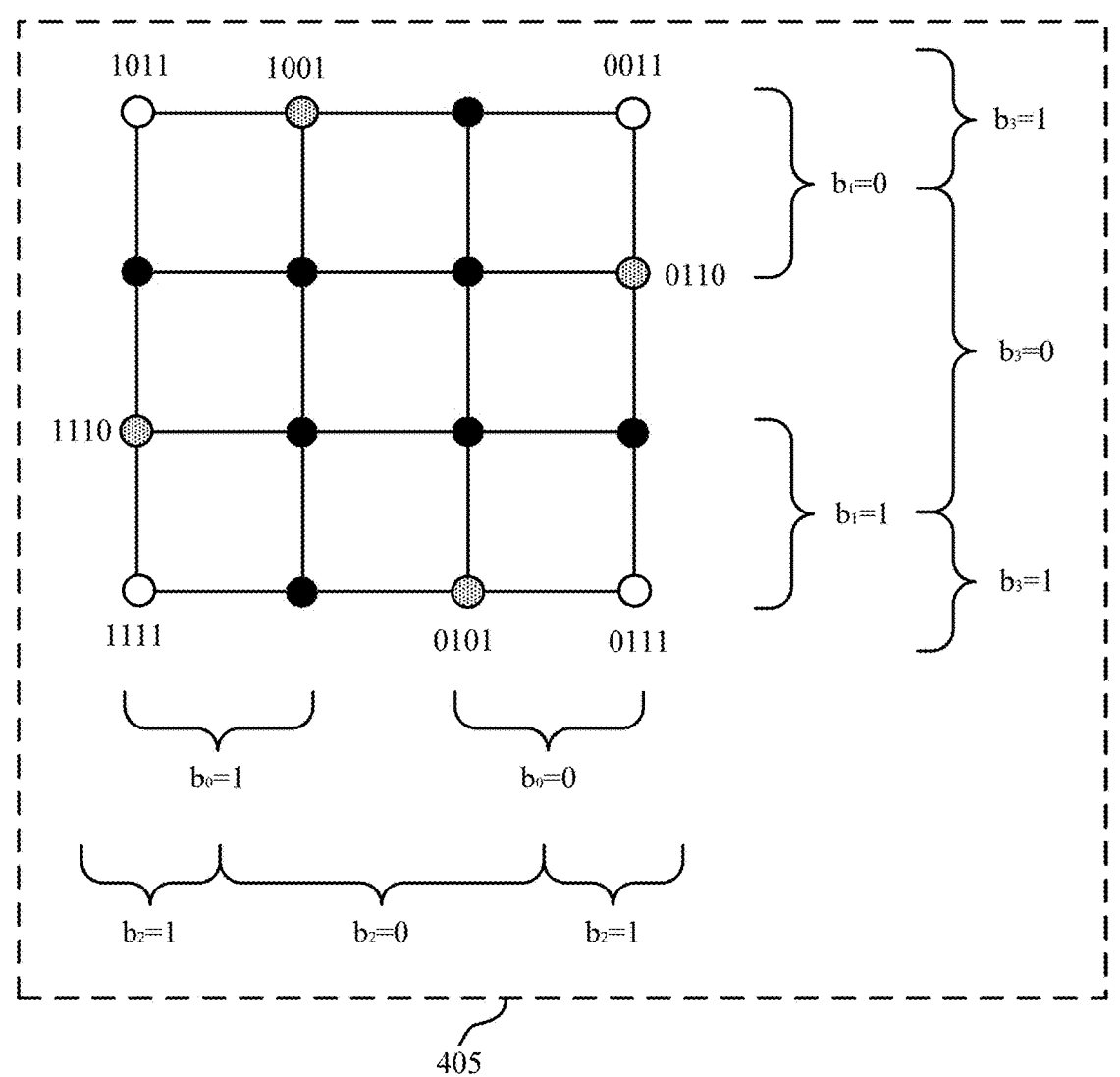
FIG. 4 shows an example of a bit mapping scheme that supports bit interleaving of modulation symbol mapping for DCRSs in accordance with one or more aspects of the present disclosure.

FIG. 4 shows an example of a bit mapping scheme 400 that supports bit interleaving of modulation symbol mapping for DCRSs in accordance with one or more aspects of the present disclosure. The bit mapping scheme 400 may implement, or be implemented by, aspects of the wireless communications system 100, the wireless communications system 200, the bit mapping scheme 300, or any combination thereof. For example, a transmitting wireless device (e.g., a UE 115, or a network entity 105), and a receiving wireless device (e.g., a UE 115 or a network entity 105), which may be examples of corresponding devices described with reference to FIGS. 1-3, may perform wireless communications in accordance with the bit mapping scheme 400.

As described in greater detail with reference to FIGS. 3 and 4, to increase a Euclidean distance between subsets of PDSCH or PUSCH constellation points while maintaining bit to symbol mapping according to a single SBPM interleaver, the transmitting device may map DCRS bits to MSBs of a higher order modulation (e.g., a 16 QAM constellation 405). To map DCRSs with a lower modulation order to a higher order constellation 405, the wireless device may map DCRS bits to a sub-constellation of the constellation 405 (e.g., as described in greater detail with reference to FIG. 4). For example, the transmitting device may map a codepoint (e.g., four bits $b_0b_1b_2b_3$) from an interleaving table (e.g., a column of an SBPM interleaver) to one of sixteen candidate constellation points in a 16 QAM constellation 405. The device may also map DCRS bits to a sub-constellation corresponding to the MSBs of a column of the interleaving table, and may also set padding bits to increase a Euclidean distance. For instance, the wireless device may select a first sub-constellation 410 with padding bits 11 (e.g., the constellation points corresponding to the bits 1011, 0011, 0111, and 1111) for transmission of the DCRS bits.

According to the interleaving table (e.g., an SBPM interleaver), DCRS REs may be mapped to a single column of the interleaving table and DCRS bits may be mapped to the MSB bits (e.g., the first set of rows of the interleaving table). Padded LSB bits may be selected to increase the Euclidean distance of the DCRS constellation. In some examples (e.g., due to gray code structure of the modulation order, such as QAM), mapping DCR bits to MSBs of higher order modulation orders may increase the Euclidean distance between constellation points. Padded LSB bits may be inserted into the remaining rows of a given column, also increasing Euclidean distance between constellation points. In the case of a modulation order 2 DCRS, padded LSB bits may be set to 11 so that the four constellation points on four corners of a 16 QAM constellation 405.

In some examples, if the transmitting device chooses the same padding bits to increase the Euclidean distance for DCRS REs, then an average power for the DCRS REs may be higher than an average power of the PDSCH or PUSCH REs. In some examples, such increased average power may have a negative impact on channel estimation (e.g., in the case of virtual pilots for channel estimation).

To reduce the possibility of increased average power for DCRS REs, the transmitting device may select different sub-constellations for different DCRS REs. In some examples, instead of selecting the sub-constellation 410, the transmitting device may select the sub-constellation 415 (e.g., including four candidate codepoints at different constellation points, such as 0110, 0101, 1001, and 1110. The sub-constellation 415 may have a second largest Euclidean distance between constellation points (e.g., second to the sub-constellation 410 which may correspond to the largest Euclidean distance between constellation points). Selection of different sub-constellations for different DCRS REs may reduce the average power of the DCRSs in a given symbol.

For different DCRS REs in an OFDM symbol, the transmitting device may select different sub-constellations to reduce the average power. For different sub-constellations, different sets of padding bits may be used (e.g., LSBs of the interleaving table for a column corresponding to a DCRS RE may be set differently for different sub-constellations). Each sub-constellation may correspond to different threshold Euclidean distances and average power values. In some examples, the transmitting device may autonomously select a sub-constellation for each DCRS RE or set of DCRS REs. In some examples, the network entity may transmit control signaling indicating which sub-constellation is to be selected for an uplink transmission via a PUSCH, or may indicate which sub-constellation is selected for a pending downlink transmission via PDSCH. In some examples, the network entity may transmit control signaling indicating a set of candidate sub-constellations, and may (e.g., subsequently) transmit control signaling indicating one of the candidate sub-constellations for use in a next or pending PUSCH or PDSCH transmission. In some examples, the network entity may configure a sub-constellation for use during a particular time period or time window, or if one or more conditions are satisfied.

In some examples, the sub-constellations may be indexed. Sub-constellation indices may be selected or defined as a function of DCRS tones or RE indices in a symbol. For example, a specific tone set of REs (e.g., a set of frequency resources, a band, a subband, a bandwidth part, a subset of DCRS REs, etc.) may correspond to a particular sub-constellation index. Such a relationship between REs and sub-constellation indices may be defined in one or more standards, configured via control signaling, or a combination thereof. The UE may receive control signaling configuring the REs for the DCRSs, and may determine the appropriate sub-constellation for DCRS REs based on the index corresponding to the configured DCRS REs.

In some examples, as described in greater detail with reference to FIG. 5, the transmitting device may support different modulation orders within one SLIV, and may exploit only MSBs mapped to DCRS REs.

Figure 5:
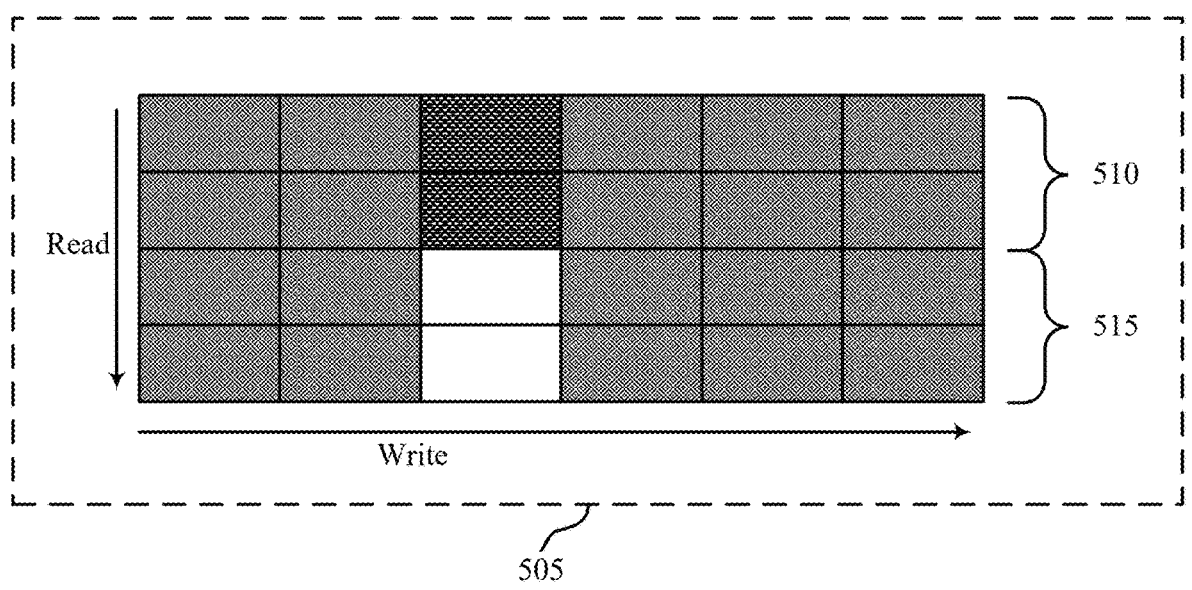
FIG. 5 shows an example of a bit mapping scheme that supports bit interleaving of modulation symbol mapping for DCRSs in accordance with one or more aspects of the present disclosure.

FIG. 5 shows an example of a bit mapping scheme 500 that supports bit interleaving of modulation symbol mapping for DCRSs in accordance with one or more aspects of the present disclosure. The bit mapping scheme 500 may implement, or be implemented by, aspects of the wireless communications system 100, the wireless communications system 200, the bit mapping scheme 300, the bit mapping scheme 400, or any combination thereof. For example, a transmitting wireless device (e.g., a UE 115, or a network entity 105), and a receiving wireless device (e.g., a UE 115 or a network entity 105), which may be examples of corresponding devices described with reference to FIGS. 1-4, may perform wireless communications in accordance with the bit mapping scheme 500.

In some examples, the modulation order for DCRS REs and data REs may be different. For instance, the data REs may correspond to a higher modulation order (e.g., modulation order four) and the DCRS REs may correspond to a lower modulation order (e.g., modulation order two). In such examples, a QAM modulator at a transmitting device and a demapper at a receiving device may support different modulation orders within one SLIV. The transmitting device may write a bitstream including data bits 520 and DCRS bits 525 in accordance with an interleaving table 505. The interleaving table 505 may be an example of an SBPM interleaver. The transmitting device may write the bitstream horizontally, and then vertically (e.g., writing a bit into each column across a first row, then into each column across a second row, etc.). The number of rows in the interleaving table 505 may be equal to the modulation order of the data bits 520 (e.g., modulation order 4, which may correspond to a 16 QAM constellation). The top rows of the interleaving table 505 may correspond to MSBs 510, and the lowest rows of the interleaving table 505 may correspond to LSBs 515.

In some examples, for columns of the interleaving table 505 mapped to the DCRS REs, only the top rows (e.g., the MSBs 510) may be exploited (e.g., occupied), and lower rows (e.g., the LSBs 515) may be unexploited (e.g., unoccupied). The transmitting device may write the bitstream according to the interleaving table 505. For columns corresponding to the DCRS REs, the transmitting device may skip the unexploited rows (e.g., may not write a bit into the skipped entries 530). For example, a data bit 520 in the fourth column and third row of the interleaving table 505 may immediately follow a data bit 520 in the second column and the third row due to the unoccupied skipped entry 530 in the third column and he third row. Similarly, a data bit 520 in the fourth column and fourth row of the interleaving table 505 may immediately follow a data bit 520 in the second column and the fourth row due to the unoccupied skipped entry 530 in the third column and he fourth row.

Similarly, unoccupied entries rows may be skipped in reading the bitstream by the receiving device. For example, a receiving device may read the DCRS bits 525 in the first and second rows of the third column of the interleaving table 505, and may immediately read the next data bit 520 in the first row and the fourth column of the interleaving table 505 (e.g., ignoring or refraining from reading anything corresponding to the skipped entries 530 located in the third and fourth rows of the third column of the interleaving table 505). Bits read from the columns corresponding to DCRS REs may be mapped to QAM symbols with the same modulation order as the DCRS (e.g., a modulation order two, instead of a modulation order 4 corresponding to the data bits 520).

In some examples, as described with reference to FIG. 6, data bits 520 may be written and mapped to constellation points according to a first interleaving table corresponding to a first modulation order, and DCRS bits 525 may be written and mapped to constellation points according to a second interleaving table corresponding to a second modulation order.

Figure 6:
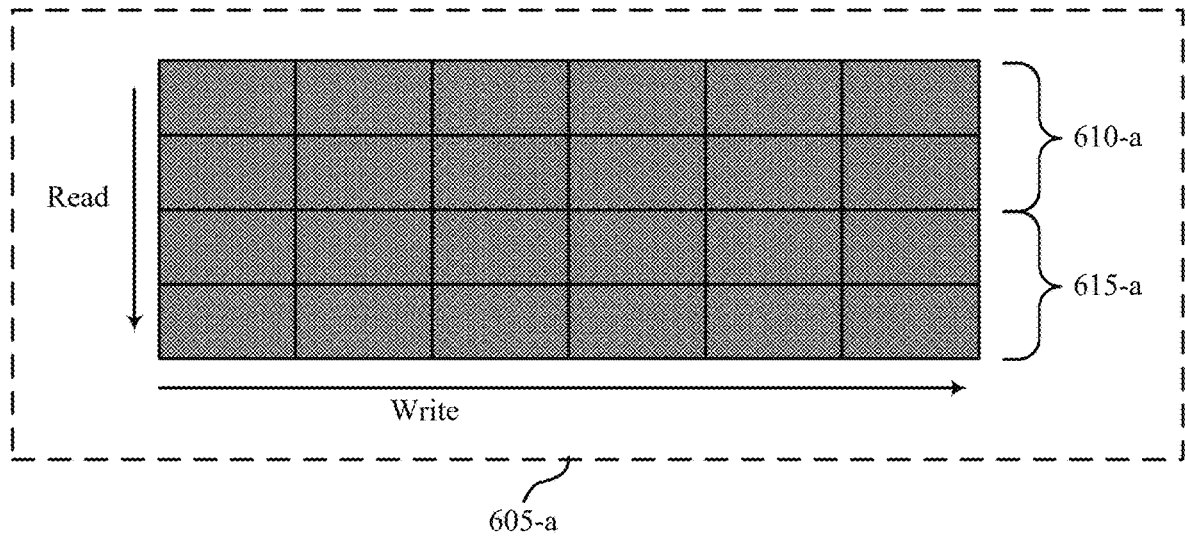
FIG. 6 shows an example of a bit mapping scheme that supports bit interleaving of modulation symbol mapping for DCRSs in accordance with one or more aspects of the present disclosure.
Figure 6:
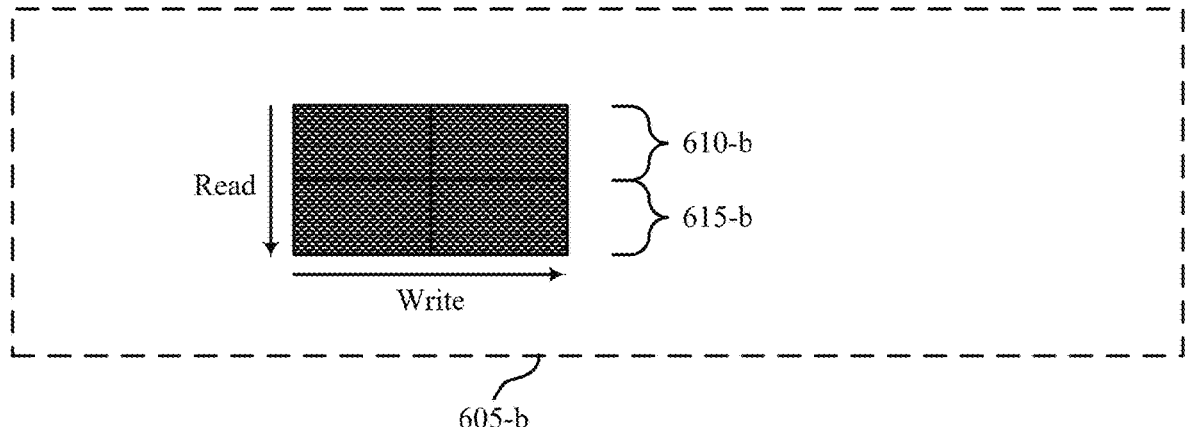

FIG. 6 shows an example of a bit mapping scheme 600 that supports bit interleaving of modulation symbol mapping for DCRSs in accordance with one or more aspects of the present disclosure. The bit mapping scheme 600 may implement, or be implemented by, aspects of the wireless communications system 100, the wireless communications system 200, the bit mapping scheme 300, the bit mapping scheme 400, the bit mapping scheme 500, or any combination thereof. For example, a transmitting wireless device (e.g., a UE 115, or a network entity 105), and a receiving wireless device (e.g., a UE 115 or a network entity 105), which may be examples of corresponding devices described with reference to FIGS. 1-5, may perform wireless communications in accordance with the bit mapping scheme 600.

In some examples, a transmitting device may generate a bitstream in accordance with multiple interleaving tables 605. For instance, as described herein, data REs may correspond to a higher modulation order than DCRS REs. In such examples, instead of mapping bits to the bitstream and the respective REs via a single interleaver column (e.g., because DCRS columns may have fewer rows than data columns), the data bits 620 and the DCRS bits 625 may be written and mapped in accordance with two different interleaving tables. The interleaving table 605-a (e.g., an SBPM interleaver) may correspond to data REs, and may have a quantity of rows equal to a modulation order for the data REs. A first set of rows may correspond to MSBs 610-a, and a second set of rows may correspond to LSBs 615-a. Similarly, the interleaving table 605-b (e.g., an SBPM interleaver) may correspond to DCRS REs, and may have a quantity of rows equal to a modulation order for the DCRS REs. A first set of rows may correspond to MSBs 610-*b*, and a second set of rows may correspond to LSBs 615-*b*.

The network entity may configure two separate interleaving tables (e.g., the interleaving table 605-*a* for data REs and the interleaving table 605-*b* for DCRS REs). The transmitting device may write coded bits into the two tables sequentially with columns first and rows later (e.g., horizontally first, then vertically, filling first one row then another). In some examples, one table may be filled first, then the other (e.g., according to one or more rules, or as configured by the network). For example, the transmitting device may write the DCRS bits 625 into the interleaving table 605-*b* first, and may then write the data bits 620 into the interleaving table 605-*a* (e.g., because the DCRS bits have better protection for the information bits due to the lower modulation order and smaller table size). The receiving device may read the bits for QAM symbols, and may read the DCRS interleaving table 605-*b* for DCRS REs, and may then read the data interleaving table 605-*a* for data REs second (e.g., according to a configured order or according to one or more rules).

Figure 7:
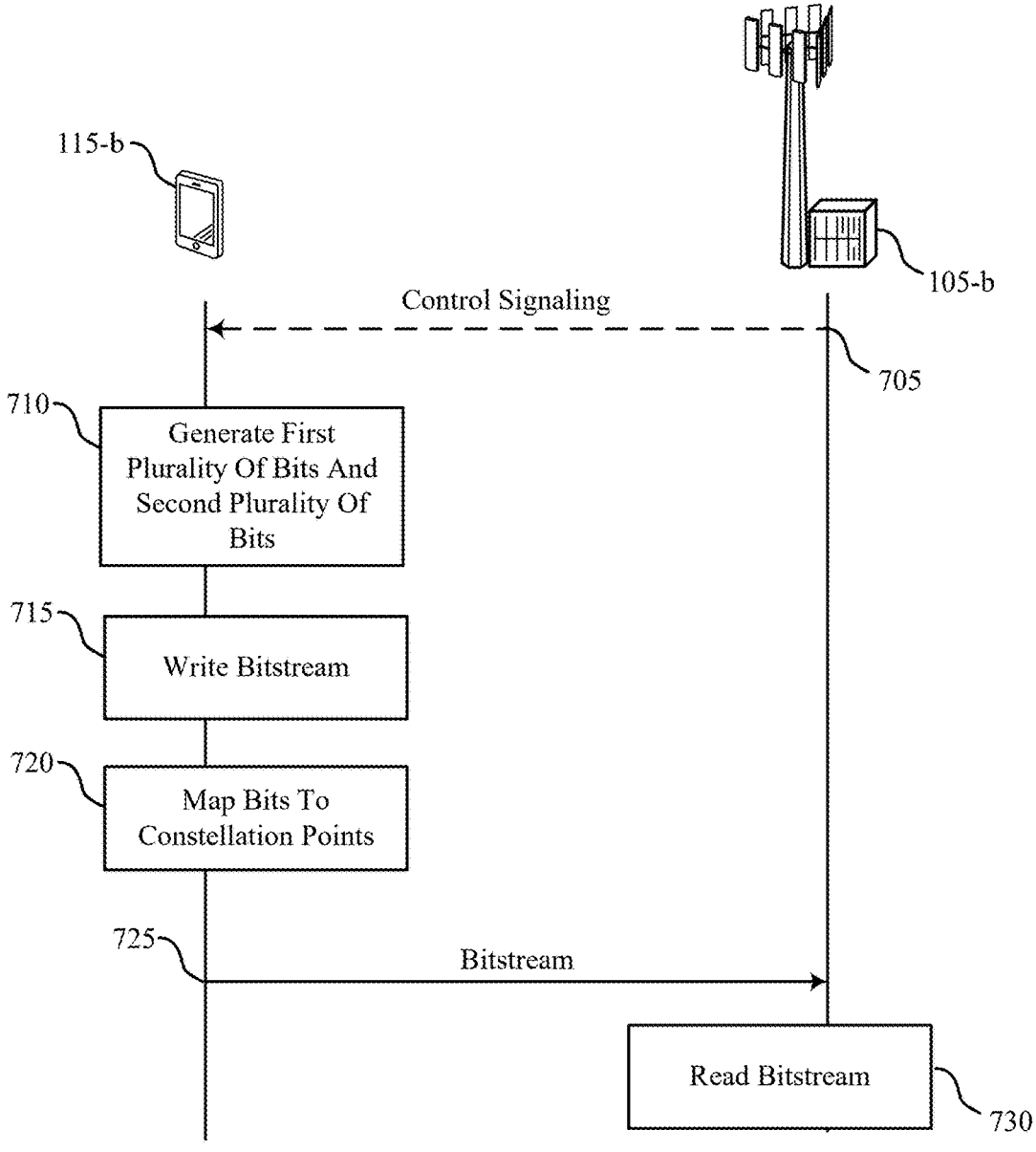
FIG. 7 shows an example of a process flow that supports bit interleaving of modulation symbol mapping for DCRSs in accordance with one or more aspects of the present disclosure.

FIG. 7 shows an example of a process flow 700 that supports bit interleaving of modulation symbol mapping for DCRSs in accordance with one or more aspects of the present disclosure. The process flow may implement, or be implemented by, aspects of the wireless communications system 100, the wireless communications system 200, the bit mapping scheme 300, the bit mapping scheme 400, the bit mapping scheme 500, the bit mapping scheme 600, or any combination thereof. For example, the process flow 700 may include a first wireless device and a second wireless device. As illustrated with reference to FIG. 7, the transmitting device may be a UE 115-*b* transmitting uplink signaling (e.g., to the network entity 105-*b*) including data and DCRSs via a PUSCH. However, similar techniques may be applied to the case where the network entity 105-*b* is the transmitting device sending downlink signaling and DCRSs via a PDSCH.

At 710, the UE 115-*b* may generate a first set of bits corresponding to a set of REs allocated for data transmissions (e.g., data bits), and a second set of bits corresponding to a second set of REs allocated for DCRSs (e.g., DCRS bits). The data bits and the DCRS bits may correspond to a same coding rate and different modulation orders. The modulation order for the DCRS bits may be lower than the modulation order of the data bits.

At 715, the UE 115-*b* may write the set if bits including the first set of bits and the second set of bits into a bitstream in accordance with an interleaving table (e.g., an SBPM interleaver or table). One or more MSBs may be located in a first subset of rows of the interleaving table and one or more LSBs may be located in a second subset of rows of the interleaving table. For example, the UE 115-*b* may select the one or more MSBs for the second set of REs to carry data for the DCRSs. The UE 115-*b* may also select one or more padding bits as the one or more LSBs for the second set of REs. The padding bits may correspond to a threshold (e.g., increased or maximum) Euclidean distance with respect to the constellation points. In some examples, as described in greater detail with reference to FIG. 4, the UE 115-*b* may select the sub-constellation from a set of candidate sub-constellations. Each sub-constellation of the set of candidate sub-constellations may correspond to a subset of the DCRS REs, and selecting the sub-constellation may be based on an index associated with the subset of DCRS REs. Each sub-constellation may correspond to different sets of padding bits (e.g., values of the padded bits).

In some examples, at 705, the UE 115-*b* may receive control signaling indicating the first sub-constellation of the set of candidate sub-constellations. Selecting the first subset of the constellation points (e.g., the first sub-constellation) may be based on the control signaling received at 705.

At 720, the UE 115-*b* may map the first set of bits of the bitstream to constellation points of a constellation corresponding to the higher modulation order of the data REs. The UE 115-*b* may also map the second set of bits of the bitstream to a subset of the constellation points (e.g., a sub-constellation) in accordance with the interleaving table. A quantity of the constellation points may be in accordance with the first modulation order, and a quantity of the subset of constellation points may be in accordance with the lower modulation order.

At 725, the UE 115-*b* may transmit the bitstream based on the mapping. At 730, the network entity 105-*b* may read the bitstream received at 725. The network entity 105-*b* may read the bitstream in accordance with the interleaving table.

Figure 8:
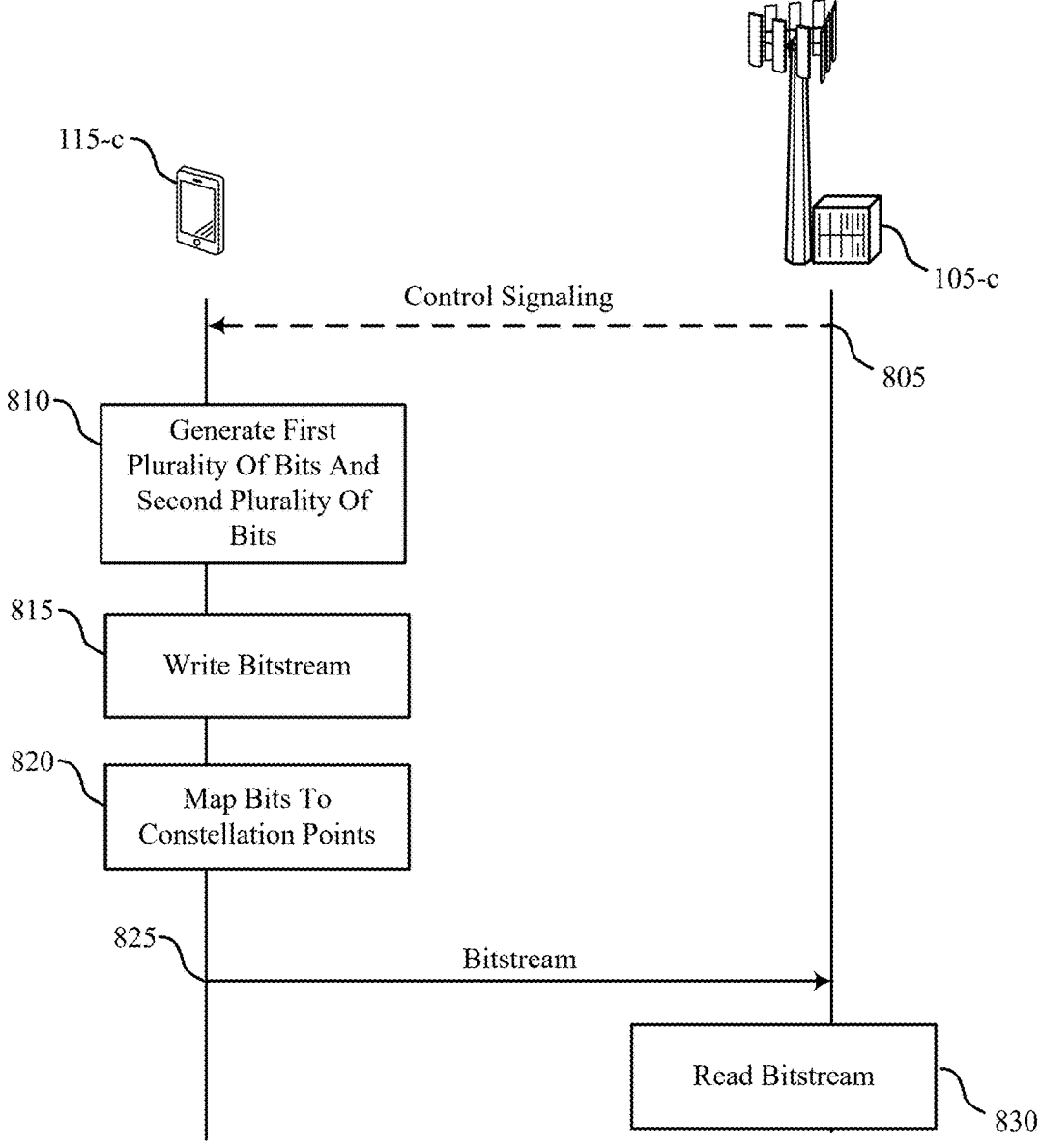
FIG. 8 shows an example of a process flow that supports bit interleaving of modulation symbol mapping for DCRSs in accordance with one or more aspects of the present disclosure.

FIG. 8 shows an example of a process flow 800 that supports bit interleaving of modulation symbol mapping for DCRSs in accordance with one or more aspects of the present disclosure. The process flow 800 may implement, or be implemented by, aspects of the wireless communications system 100, the wireless communications system 200, the bit mapping scheme 300, the bit mapping scheme 400, the bit mapping scheme 500, the bit mapping scheme 600, the process flow 700, or any combination thereof. For example, the process flow 800 may include a first wireless device and a second wireless device. As illustrated with reference to FIG. 8, the transmitting device may be a UE 115-*c* transmitting uplink signaling (e.g., to the network entity 105-*c*) including data and DCRSs via a PUSCH. However, similar techniques may be applied to the case where the network entity 105-*c* is the transmitting device sending downlink signaling and DCRSs via a PDSCH.

At 805, the UE 115-*c* may receive control signaling. The control signaling may indicate a bit interleaving table, MCS information, or the like. In some examples, the control signaling may indicate one or more entries in the interleaving table to be skipped (e.g., at 815).

At 810, the UE 115-*c* may generate a first set of bits corresponding to a first set of REs allocated for data transmissions and a second set of bits corresponding to a second set of REs allocated for DCRSs. The first set of bits correspond to a first coding rate and a first modulation order, and the second set of bits correspond to the first coding rate and a second modulation order that is lower than the first modulation order.

At 815, the UE 115-*c* may write the set if bits including the first set of bits and the second set of bits into a bitstream in accordance with an interleaving table (e.g., an SBPM interleaver). The second set of bits may be located in a first subset of rows of the interleaving table corresponding to MSBs, and one or more entries in the interleaving table of a second subset of rows corresponding to LSBs of the second set of REs may be unoccupied (e.g., unexploited). Writing the DCRS bits into the bitstream may include writing the DCRS bits into a first column of the interleaving table such that the first subset of rows corresponding to MSBs are occupied by the DCRS bits, and the rows corresponding to the LSBs of the same column are unoccupied (e.g., skipped).

At 820, the UE 115-*c* may map the bitstream to constellation points in accordance with the interleaving table. A quantity of the constellation points may be in accordance with (e.g., equal to) the first modulation order.

At 825, the UE 115-*c* may transmit the bitstream. At 830, the network entity 105-*c* may read the bitstream. For example, the network entity 105-*c* may also skip the unoccupied entries of the interleaving table.

Figure 9:
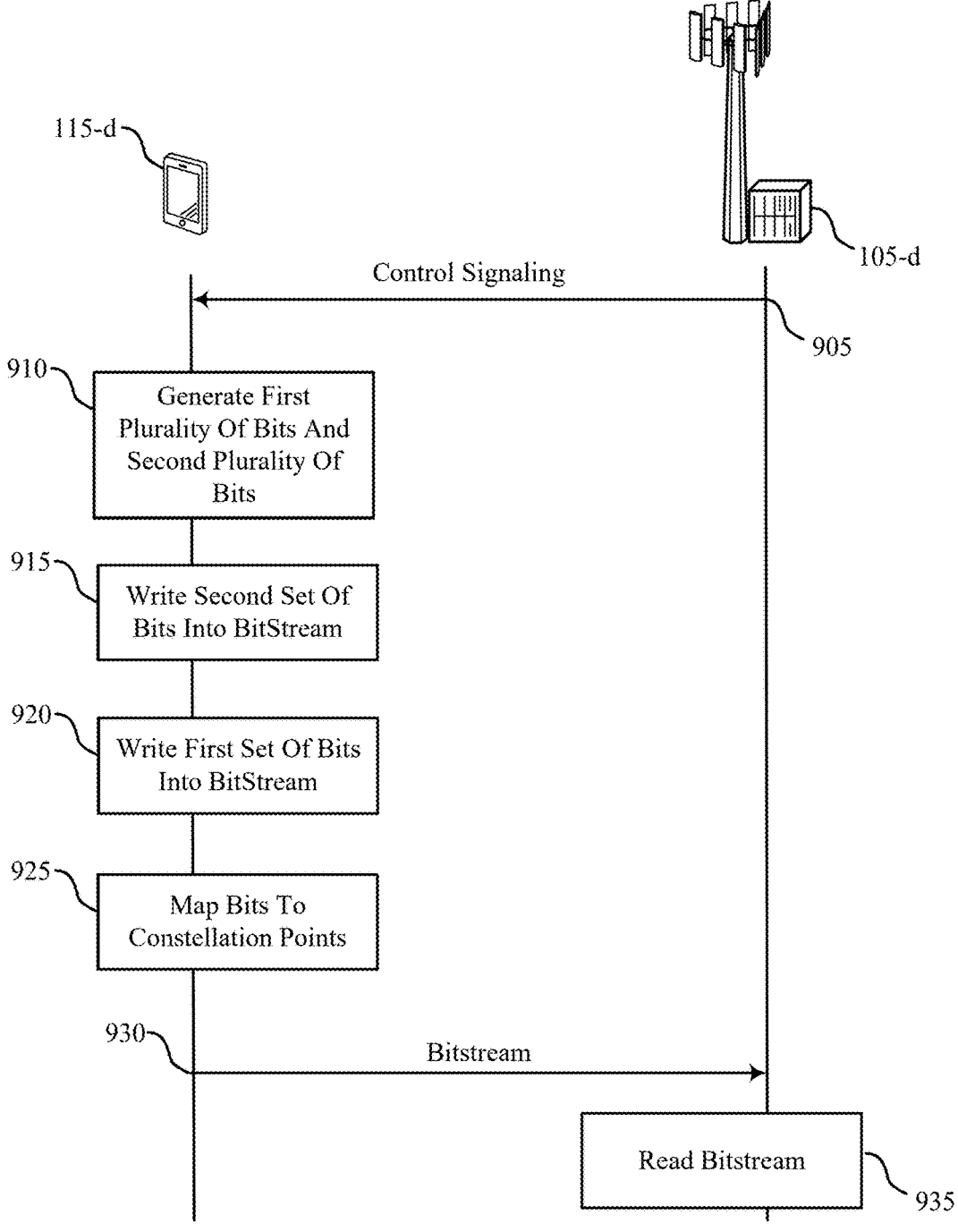
FIG. 9 shows an example of a process flow that supports bit interleaving of modulation symbol mapping for DCRSs in accordance with one or more aspects of the present disclosure.

FIG. 9 shows an example of a process flow 900 that supports bit interleaving of modulation symbol mapping for DCRSs in accordance with one or more aspects of the present disclosure. The process flow 900 may implement, or be implemented by, aspects of the wireless communications system 100, the wireless communications system 200, the bit mapping scheme 300, the bit mapping scheme 400, the bit mapping scheme 500, the bit mapping scheme 600, the process flow 700, the process flow 800, or any combination thereof. For example, the process flow 900 may include a first wireless device and a second wireless device. As illustrated with reference to FIG. 9, the transmitting device may be a UE 115-*c* transmitting uplink signaling (e.g., to the network entity 105-*c*) including data and DCRSs via a PUSCH. However, similar techniques may be applied to the case where the network entity 105-*c* is the transmitting device sending downlink signaling and DCRSs via a PDSCH.

At 905, the UE 115-*d* may receive control signaling indicating a first interleaving table and a second interleaving table, the first interleaving table including a first quantity of rows corresponding to a first modulation order, and the second interleaving table including a second quantity of rows corresponding to a second modulation order.

At 910, the UE 115-*d* may generate a first et of bits corresponding to a first set of REs allocated for data transmissions (e.g., data REs) and a second set of bits corresponding to a second set of REs allocated for DCRSs (e.g., DCRS REs). The first set of bits corresponds to a first coding rate and a first modulation order, and the second set of bits corresponds to the same coding rate and a different (e.g., lower) modulation order.

At 915, the UE 115-*d* may write the second set of bits into the bitstream in accordance with the second interleaving table (e.g., a second SBPM interleaver for the DCRS REs).

At 920, the UE 115-*d* may write the set if bits including the first set of bits into a bitstream in accordance with the first interleaving table (e.g., a first SBPM interleaver for the data REs).

At 925, the UE 115-*d* may map the first and second sets of bits to constellation points (e.g., the first set of bits to a first constellation corresponding to the first modulation order, and the second set of bits to a second constellation corresponding to the second modulation order).

At 930, the UE 115-*d* may transmit the bitstream in accordance with the writing and the mapping. At 935, the network entity 105-*d* may read the bitstream. The network entity 105-*d* may read the second set of bits and the first set of bits in the order in which they were written into the bitstream (e.g., based on the control signaling, one or more rules, or both).

Figure 10:
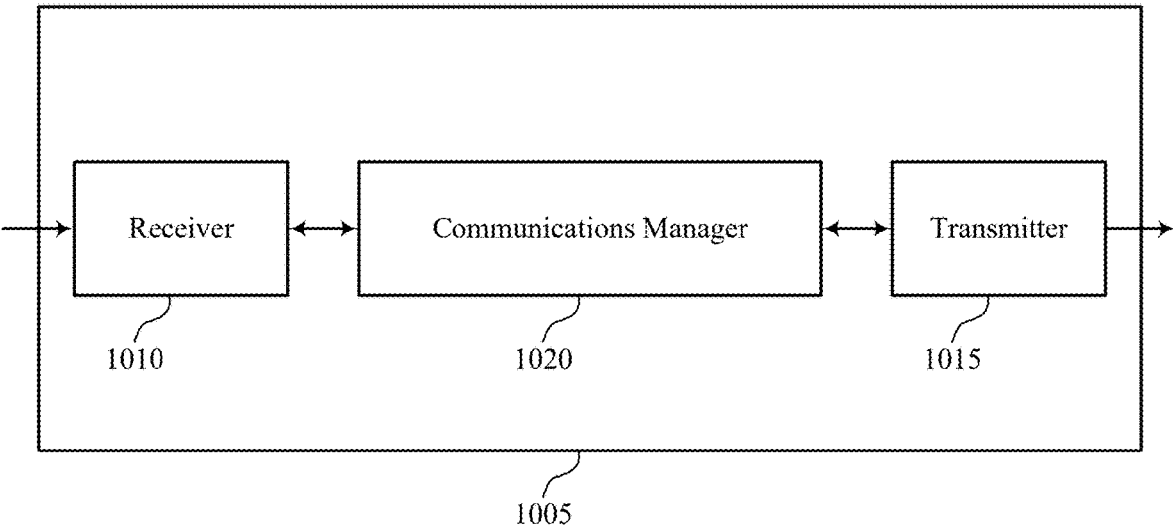
FIGS. 10 and 11 show block diagrams of devices that support bit interleaving of modulation symbol mapping for DCRSs in accordance with one or more aspects of the present disclosure.

FIG. 10 shows a block diagram 1000 of a device 1005 that supports bit interleaving of modulation symbol mapping for DCRSs in accordance with one or more aspects of the present disclosure. The device 1005 may be an example of aspects of a UE 115 as described herein. The device 1005 may include a receiver 1010, a transmitter 1015, and a communications manager 1020. The device 1005, or one or more components of the device 1005 (e.g., the receiver 1010, the transmitter 1015, the communications manager 1020), may include at least one processor, which may be coupled with at least one memory, to, individually or collectively, support or enable the described techniques. Each of these components may be in communication with one another (e.g., via one or more buses).

The receiver 1010 may provide a means for receiving information such as packets, user data, control information, or any combination thereof associated with various information channels (e.g., control channels, data channels, information channels related to bit interleaving of modulation symbol mapping for DCRSs). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to bit interleaving of modulation symbol mapping for DCRSs). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations or components thereof may be examples of means for performing various aspects of bit interleaving of modulation symbol mapping for DCRSs as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor (e.g., referred to as a processor-executable code). If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for generating a set of bits including a first set of multiple bits corresponding to a first set of REs allocated for data transmissions and a second set of multiple bits corresponding to a second set of REs allocated for DCRSs, where the first set of multiple bits corresponds to a first coding rate and a first modulation order and the second set of multiple bits corresponds to the first coding rate and a second modulation order that is lower than the first modulation order. The communications manager 1020 is capable of, configured to, or operable to support a means for writing the set if bits including the first set of multiple bits and the second set of multiple bits into a bitstream in accordance with an interleaving table, where one or more most significant bits are located in a first subset of rows of the interleaving table and one or more less significant bits are located in a second subset of rows of the interleaving table. The communications manager 1020 is capable of, configured to, or operable to support a means for mapping the first set of multiple bits of the bitstream to a set of multiple constellation points and the second set of multiple bits of the bitstream to a subset of the set of multiple constellation points in accordance with the interleaving table, where a quantity of the set of multiple constellation points is in accordance with the first modulation order, and a quantity of the subset of the set of multiple constellation points is in accordance with the second modulation order. The communications manager 1020 is capable of, configured to, or operable to support a means for transmitting the bitstream based on the mapping.

Additionally, or alternatively, the communications manager 1020 may support wireless communications in accordance with examples as disclosed herein. For example, the communications manager 1020 is capable of, configured to, or operable to support a means for generating a set of bits including a first set of multiple bits corresponding to a first set of REs allocated for data transmissions and a second set of multiple bits corresponding to a second set of REs allocated for data-carrying reference signals, where the first set of multiple bits corresponds to a first coding rate and a first modulation order and the second set of multiple bits corresponds to the first coding rate and a second modulation order that is lower than the first modulation order. The communications manager 1020 is capable of, configured to, or operable to support a means for writing the set if bits including the first set of multiple bits and the second set of multiple bits into a bitstream in accordance with an interleaving table, where the second set of multiple bits are located in a first subset of rows of the interleaving table corresponding to most significant bits, and one or more entries in the interleaving table of a second subset of rows corresponding to least significant bits of the second set of REs are unoccupied. The communications manager 1020 is capable of, configured to, or operable to support a means for mapping the bitstream to a set of multiple constellation points in accordance with the interleaving table, where a quantity of the set of multiple constellation points is in accordance with the first modulation order. The communications manager 1020 is capable of, configured to, or operable to support a means for transmitting the bitstream based on the mapping.

Additionally, or alternatively, the communications manager 1020 may support wireless communications in accordance with examples as disclosed herein. For example, the communications manager 1020 is capable of, configured to, or operable to support a means for receiving control signaling indicating a first interleaving table and a second interleaving table, the first interleaving table including a first quantity of rows corresponding to a first modulation order, and the second interleaving table including a second quantity of rows corresponding to a second modulation order. The communications manager 1020 is capable of, configured to, or operable to support a means for generating a set of bits including a first set of multiple bits corresponding to a first set of REs allocated for data transmissions and a second set of multiple bits corresponding to a second set of REs allocated for data-carrying reference signals, where the first set of multiple bits corresponds to a first coding rate and the first modulation order and the second set of multiple bits corresponds to the first coding rate and the second modulation order that is lower than the first modulation order. The communications manager 1020 is capable of, configured to, or operable to support a means for writing the set if bits including the first set of multiple bits into a bitstream in accordance with the first interleaving table, and the second set of multiple bits into the bitstream in accordance with the second interleaving table. The communications manager 1020 is capable of, configured to, or operable to support a means for transmitting the bitstream in accordance with the writing.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for bit interleaving of modulation symbol mapping for DCRSs resulting in more efficient use of system resources, increased reliability of wireless signaling, and more efficient use of communication resources.

Figure 11:
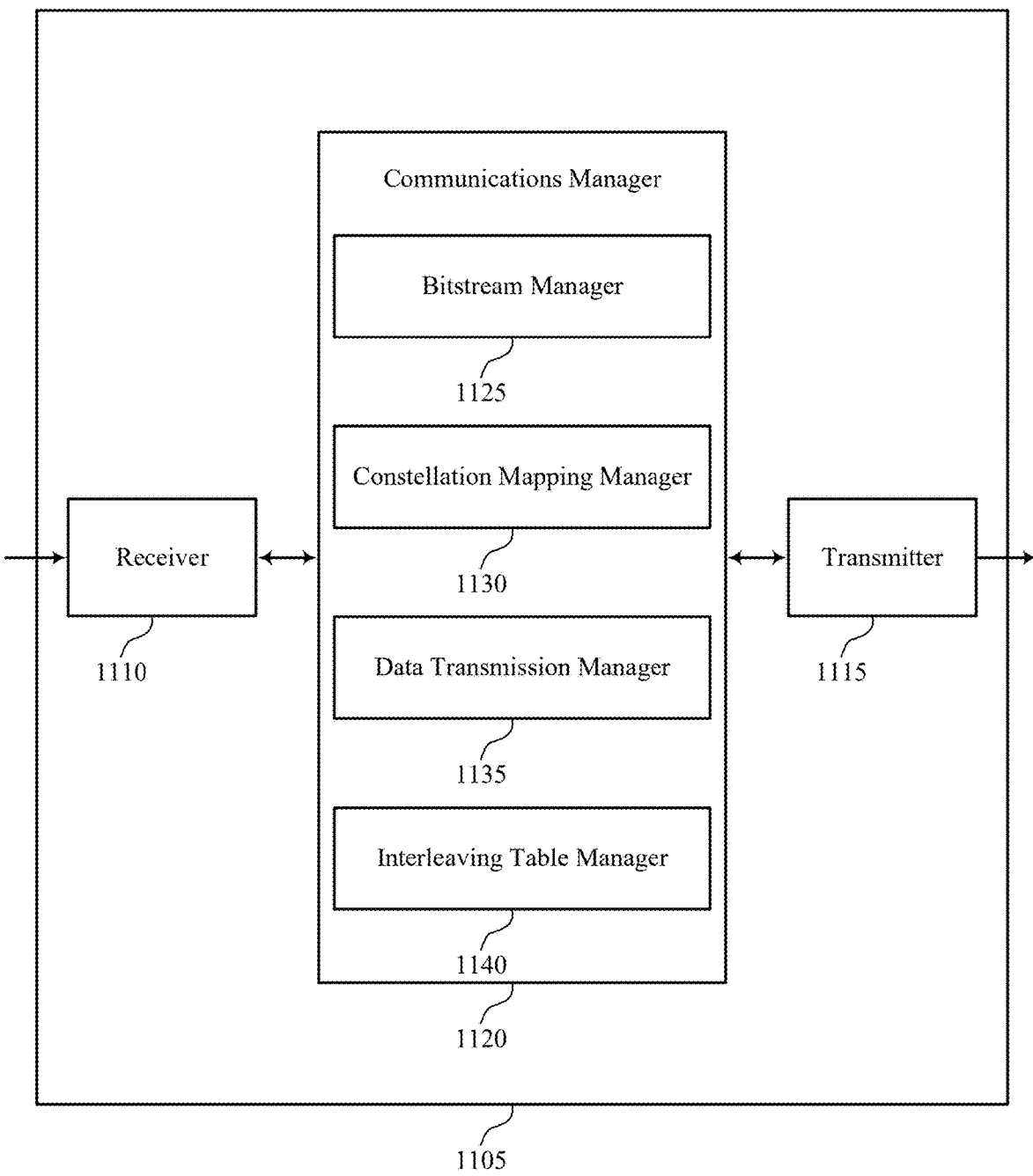

FIG. 11 shows a block diagram 1100 of a device 1105 that supports bit interleaving of modulation symbol mapping for DCRSs in accordance with one or more aspects of the present disclosure. The device 1105 may be an example of aspects of a device 1005 or a UE 115 as described herein. The device 1105 may include a receiver 1110, a transmitter 1115, and a communications manager 1120. The device 1105, or one of more components of the device 1105 (e.g., the receiver 1110, the transmitter 1115, the communications manager 1120), may include at least one processor, which may be coupled with at least one memory, to support the described techniques. Each of these components may be in communication with one another (e.g., via one or more buses).

The receiver 1110 may provide a means for receiving information such as packets, user data, control information, or any combination thereof associated with various information channels (e.g., control channels, data channels, information channels related to bit interleaving of modulation symbol mapping for DCRSs). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to bit interleaving of modulation symbol mapping for DCRSs). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of bit interleaving of modulation symbol mapping for DCRSs as described herein. For example, the communications manager 1120 may include a bitstream manager 1125, a constellation mapping manager 1130, a data transmission manager 1135, an interleaving table manager 1140, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The bitstream manager 1125 is capable of, configured to, or operable to support a means for generating a set of bits including a first set of multiple bits corresponding to a first set of REs allocated for data transmissions and a second set of multiple bits corresponding to a second set of REs allocated for DCRSs, where the first set of multiple bits corresponds to a first coding rate and a first modulation order and the second set of multiple bits corresponds to the first coding rate and a second modulation order that is lower than the first modulation order. The bitstream manager 1125 is capable of, configured to, or operable to support a means for writing the set if bits including the first set of multiple bits and the second set of multiple bits into a bitstream in accordance with an interleaving table, where one or more most significant bits are located in a first subset of rows of the interleaving table and one or more less significant bits are located in a second subset of rows of the interleaving table. The constellation mapping manager 1130 is capable of, configured to, or operable to support a means for mapping the first set of multiple bits of the bitstream to a set of multiple constellation points and the second set of multiple bits of the bitstream to a subset of the set of multiple constellation points in accordance with the interleaving table, where a quantity of the set of multiple constellation points is in accordance with the first modulation order, and a quantity of the subset of the set of multiple constellation points is in accordance with the second modulation order. The data transmission manager 1135 is capable of, configured to, or operable to support a means for transmitting the bitstream based on the mapping.

Additionally, or alternatively, the communications manager 1120 may support wireless communications in accordance with examples as disclosed herein. The bitstream manager 1125 is capable of, configured to, or operable to support a means for generating a set of bits including a first set of multiple bits corresponding to a first set of REs allocated for data transmissions and a second set of multiple bits corresponding to a second set of REs allocated for data-carrying reference signals, where the first set of multiple bits corresponds to a first coding rate and a first modulation order and the second set of multiple bits corresponds to the first coding rate and a second modulation order that is lower than the first modulation order. The bitstream manager 1125 is capable of, configured to, or operable to support a means for writing the set if bits including the first set of multiple bits and the second set of multiple bits into a bitstream in accordance with an interleaving table, where the second set of multiple bits are located in a first subset of rows of the interleaving table corresponding to most significant bits, and one or more entries in the interleaving table of a second subset of rows corresponding to least significant bits of the second set of REs are unoccupied. The constellation mapping manager 1130 is capable of, configured to, or operable to support a means for mapping the bitstream to a set of multiple constellation points in accordance with the interleaving table, where a quantity of the set of multiple constellation points is in accordance with the first modulation order. The data transmission manager 1135 is capable of, configured to, or operable to support a means for transmitting the bitstream based on the mapping.

Additionally, or alternatively, the communications manager 1120 may support wireless communications in accordance with examples as disclosed herein. The interleaving table manager 1140 is capable of, configured to, or operable to support a means for receiving control signaling indicating a first interleaving table and a second interleaving table, the first interleaving table including a first quantity of rows corresponding to a first modulation order, and the second interleaving table including a second quantity of rows corresponding to a second modulation order. The bitstream manager 1125 is capable of, configured to, or operable to support a means for generating a set of bits including a first set of multiple bits corresponding to a first set of REs allocated for data transmissions and a second set of multiple bits corresponding to a second set of REs allocated for data-carrying reference signals, where the first set of multiple bits corresponds to a first coding rate and the first modulation order and the second set of multiple bits corresponds to the first coding rate and the second modulation order that is lower than the first modulation order. The interleaving table manager 1140 is capable of, configured to, or operable to support a means for writing the set if bits including the first set of multiple bits into a bitstream in accordance with the first interleaving table, and the second set of multiple bits into the bitstream in accordance with the second interleaving table. The data transmission manager 1135 is capable of, configured to, or operable to support a means for transmitting the bitstream in accordance with the writing.

Figure 12:
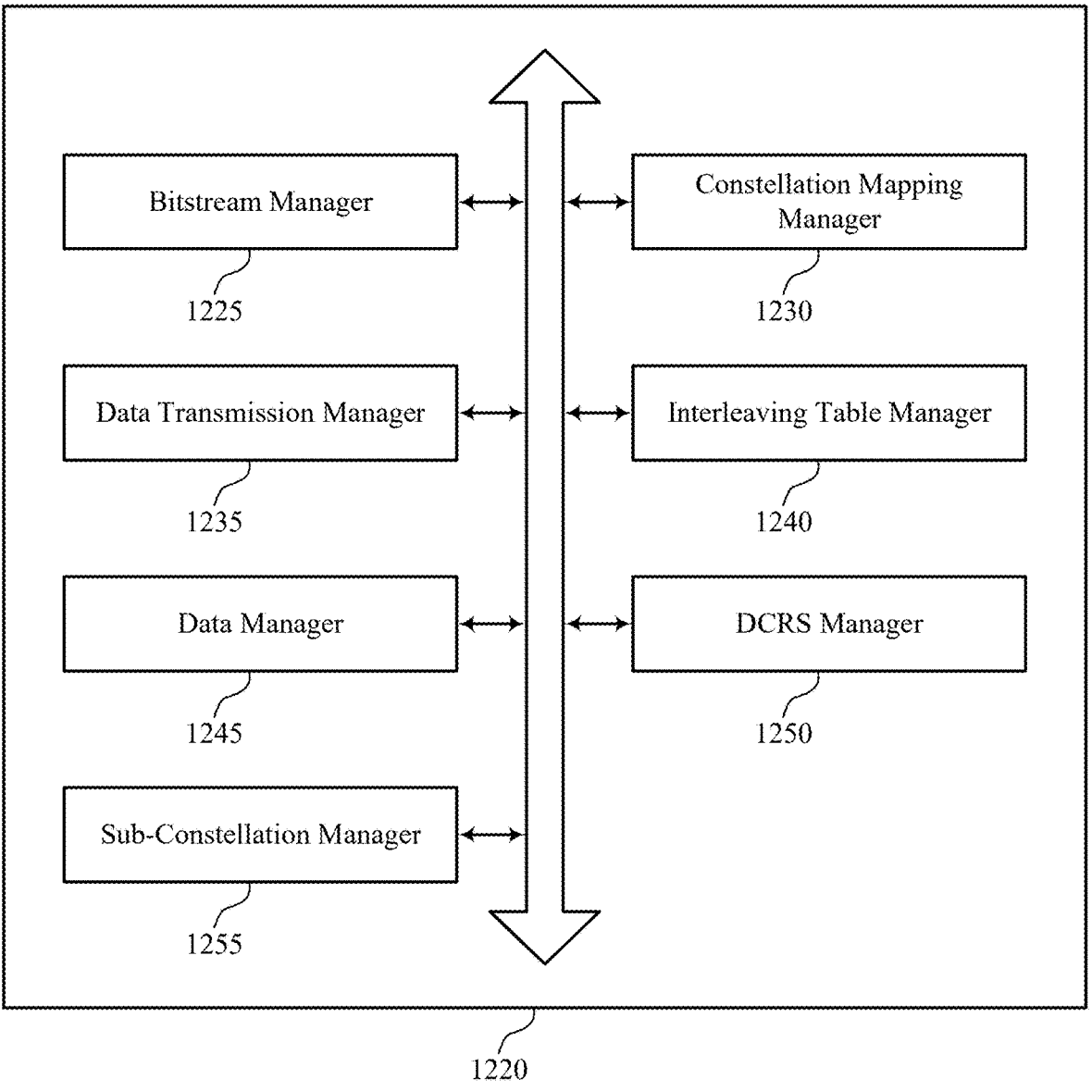
FIG. 12 shows a block diagram of a communications manager that supports bit interleaving of modulation symbol mapping for DCRSs in accordance with one or more aspects of the present disclosure.

FIG. 12 shows a block diagram 1200 of a communications manager 1220 that supports bit interleaving of modulation symbol mapping for DCRSs in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of bit interleaving of modulation symbol mapping for DCRSs as described herein. For example, the communications manager 1220 may include a bitstream manager 1225, a constellation mapping manager 1230, a data transmission manager 1235, an interleaving table manager 1240, a data manager 1245, a DCRS manager 1250, a sub-constellation manager 1255, or any combination thereof. Each of these components, or components or subcomponents thereof (e.g., one or more processors, one or more memories), may communicate, directly or indirectly, with one another (e.g., via one or more buses).

The communications manager 1220 may support wireless communications in accordance with examples as disclosed herein. The bitstream manager 1225 is capable of, configured to, or operable to support a means for generating a set of bits including a first set of multiple bits corresponding to a first set of REs allocated for data transmissions and a second set of multiple bits corresponding to a second set of REs allocated for DCRSs, where the first set of multiple bits corresponds to a first coding rate and a first modulation order and the second set of multiple bits corresponds to the first coding rate and a second modulation order that is lower than the first modulation order. In some examples, the bitstream manager 1225 is capable of, configured to, or operable to support a means for writing the set if bits including the first set of multiple bits and the second set of multiple bits into a bitstream in accordance with an interleaving table, where one or more most significant bits are located in a first subset of rows of the interleaving table and one or more less significant bits are located in a second subset of rows of the interleaving table. The constellation mapping manager 1230 is capable of, configured to, or operable to support a means for mapping the first set of multiple bits of the bitstream to a set of multiple constellation points and the second set of multiple bits of the bitstream to a subset of the set of multiple constellation points in accordance with the interleaving table, where a quantity of the set of multiple constellation points is in accordance with the first modulation order, and a quantity of the subset of the set of multiple constellation points is in accordance with the second modulation order. The data transmission manager 1235 is capable of, configured to, or operable to support a means for transmitting the bitstream based on the mapping.

In some examples, the data manager 1245 is capable of, configured to, or operable to support a means for selecting the one or more most significant bits for the second set of REs to carry data for the DCRSs. In some examples, the DCRS manager 1250 is capable of, configured to, or operable to support a means for selecting one or more padding bits as the one or more least significant bits for the second set of REs, where the one or more padding bits correspond to a threshold Euclidean distance with respect to the subset of the set of multiple constellation points.

In some examples, the sub-constellation manager 1255 is capable of, configured to, or operable to support a means for selecting the first subset of the set of multiple constellation points from a set of candidate sub-constellations, each sub-constellation of including a respective portion of constellation points of the set of multiple constellation points.

In some examples, each sub-constellation corresponding to a subset of the second set of REs. In some examples, selecting the first subset of the set of multiple constellation points is based on an allocated subset of the second set of REs.

In some examples, the sub-constellation manager 1255 is capable of, configured to, or operable to support a means for receiving control signaling indicating a first sub-constellation of the set of candidate sub-constellations, where selecting the first subset of the set of multiple constellation points is based on the control signaling.

In some examples, each sub-constellation of the set of candidate sub-constellations corresponds to a respective set of padded bits for each DCRS.

In some examples, the interleaving table includes a systematic bit priority mapping interleaver.

Additionally, or alternatively, the communications manager 1220 may support wireless communications in accordance with examples as disclosed herein. In some examples, the bitstream manager 1225 is capable of, configured to, or operable to support a means for generating a set of bits including a first set of multiple bits corresponding to a first set of REs allocated for data transmissions and a second set of multiple bits corresponding to a second set of REs allocated for data-carrying reference signals, where the first set of multiple bits corresponds to a first coding rate and a first modulation order and the second set of multiple bits corresponds to the first coding rate and a second modulation order that is lower than the first modulation order. In some examples, the bitstream manager 1225 is capable of, configured to, or operable to support a means for writing the set if bits including the first set of multiple bits and the second set of multiple bits into a bitstream in accordance with an interleaving table, where the second set of multiple bits are located in a first subset of rows of the interleaving table corresponding to most significant bits, and one or more entries in the interleaving table of a second subset of rows corresponding to least significant bits of the second set of REs are unoccupied. In some examples, the constellation mapping manager 1230 is capable of, configured to, or operable to support a means for mapping the bitstream to a set of multiple constellation points in accordance with the interleaving table, where a quantity of the set of multiple constellation points is in accordance with the first modulation order. In some examples, the data transmission manager 1235 is capable of, configured to, or operable to support a means for transmitting the bitstream based on the mapping.

In some examples, to support writing the second set of multiple bits into the bitstream, the interleaving table manager 1240 is capable of, configured to, or operable to support a means for writing the second set of multiple bits into a first column of the interleaving table, where the first subset of rows corresponding to the most significant bits of the first column are occupied by the second set of multiple bits, and where the second subset of rows corresponding to the least significant bits of the first column are unoccupied.

In some examples, a quantity of rows of the interleaving table is equal to the first modulation order.

In some examples, the interleaving table manager 1240 is capable of, configured to, or operable to support a means for receiving control signaling including an instruction to write the set if bits including the first set of multiple bits and the second set of multiple bits according to the interleaving table, and to skip one or more entries of the interleaving table corresponding to the least significant bits of the second set of REs.

In some examples, the interleaving table includes a systematic bit priority mapping interleaver.

Additionally, or alternatively, the communications manager 1220 may support wireless communications in accordance with examples as disclosed herein. The interleaving table manager 1240 is capable of, configured to, or operable to support a means for receiving control signaling indicating a first interleaving table and a second interleaving table, the first interleaving table including a first quantity of rows corresponding to a first modulation order, and the second interleaving table including a second quantity of rows corresponding to a second modulation order. In some examples, the bitstream manager 1225 is capable of, configured to, or operable to support a means for generating a set of bits including a first set of multiple bits corresponding to a first set of REs allocated for data transmissions and a second set of multiple bits corresponding to a second set of REs allocated for data-carrying reference signals, where the first set of multiple bits corresponds to a first coding rate and the first modulation order and the second set of multiple bits corresponds to the first coding rate and the second modulation order that is lower than the first modulation order. In some examples, the interleaving table manager 1240 is capable of, configured to, or operable to support a means for writing the set if bits including the first set of multiple bits into a bitstream in accordance with the first interleaving table, and the second set of multiple bits into the bitstream in accordance with the second interleaving table. In some examples, the data transmission manager 1235 is capable of, configured to, or operable to support a means for transmitting the bitstream in accordance with the writing.

In some examples, the constellation mapping manager 1230 is capable of, configured to, or operable to support a means for mapping the first set of multiple bits of the bitstream to a first set of multiple constellation points in accordance with the first interleaving table, where a quantity of the first set of multiple constellation points is in accordance with the first modulation order. In some examples, the constellation mapping manager 1230 is capable of, configured to, or operable to support a means for mapping the second set of multiple bits of the bitstream to a second set of multiple constellation points in accordance with the second interleaving table and the second modulation order, where a quantity of the second set of multiple constellation points is in accordance with the second modulation order.

In some examples, transmitting the bitstream is based on mapping the first set of multiple bits of the bitstream to the first set of multiple constellation points, and mapping the second set of multiple bits of the bitstream to the second set of multiple constellation points.

In some examples, the first interleaving table includes a first systematic bit priority mapping interleaver. In some examples, the second interleaving table includes a second systematic bit priority mapping interleaver.

Figure 13:
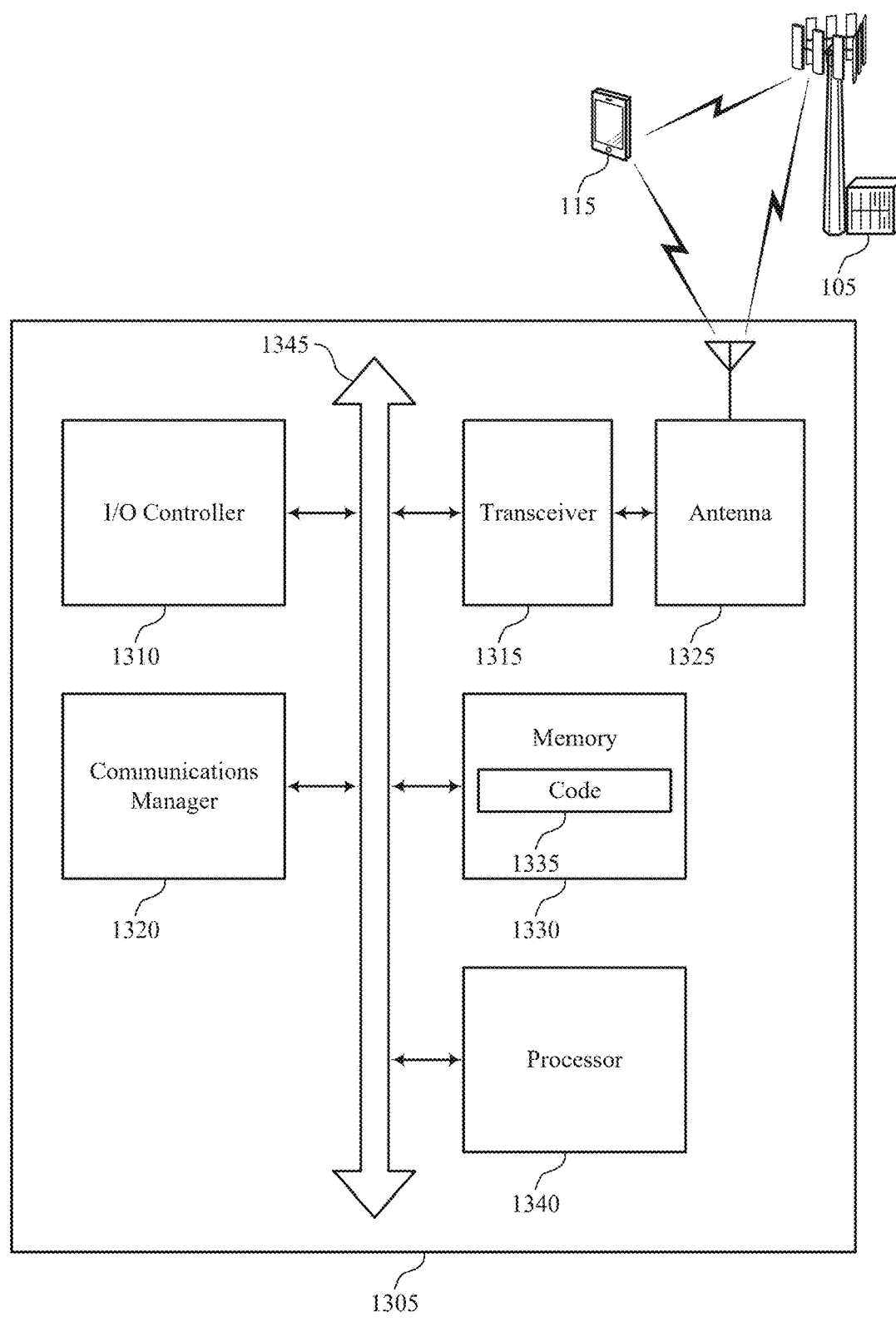
FIG. 13 shows a diagram of a system including a device that supports bit interleaving of modulation symbol mapping for DCRSs in accordance with one or more aspects of the present disclosure.

FIG. 13 shows a diagram of a system 1300 including a device 1305 that supports bit interleaving of modulation symbol mapping for DCRSs in accordance with one or more aspects of the present disclosure. The device 1305 may be an example of or include components of a device 1005, a device 1105, or a UE 115 as described herein. The device 1305 may communicate (e.g., wirelessly) with one or more other devices (e.g., network entities 105, UEs 115, or a combination thereof). The device 1305 may include components for bi-directional voice and data communications including components for transmitting and receiving communications, such as a communications manager 1320, an input/output (I/O) controller, such as an I/O controller 1310, a transceiver 1315, one or more antennas 1325, at least one memory 1330, code 1335, and at least one processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WIN-DOWS®, OS/2®, UNIX®, LINUX®, or another known operating system. Additionally, or alternatively, the I/O controller 1310 may represent or interact with a modem, a keyboard, a mouse, a touchscreen, or a similar device. In some cases, the I/O controller 1310 may be implemented as part of one or more processors, such as the at least one processor 1340. In some cases, a user may interact with the device 1305 via the I/O controller 1310 or via hardware components controlled by the I/O controller 1310.

In some cases, the device 1305 may include a single antenna. However, in some other cases, the device 1305 may have more than one antenna, which may be capable of concurrently transmitting or receiving multiple wireless transmissions. The transceiver 1315 may communicate bi-directionally via the one or more antennas 1325 using wired or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The at least one memory 1330 may include random access memory (RAM) and read-only memory (ROM). The at least one memory 1330 may store computer-readable, computer-executable, or processor-executable code, such as the code 1335. The code 1335 may include instructions that, when executed by the at least one processor 1340, cause the device 1305 to perform various functions described herein. The code 1335 may be stored in a non-transitory computer-readable medium such as system memory or another type of memory. In some cases, the code 1335 may not be directly executable by the at least one processor 1340 but may cause a computer (e.g., when compiled and executed) to perform functions described herein. In some cases, the at least one memory 1330 may include, among other things, a basic I/O system (BIOS) which may control basic hardware or software operation such as the interaction with peripheral components or devices.

The at least one processor 1340 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1340 may be configured to operate a memory array using a memory controller. In some other cases, a memory controller may be integrated into the at least one processor 1340. The at least one processor 1340 may be configured to execute computer-readable instructions stored in a memory (e.g., the at least one memory 1330) to cause the device 1305 to perform various functions (e.g., functions or tasks supporting bit interleaving of modulation symbol mapping for DCRSs). For example, the device 1305 or a component of the device 1305 may include at least one processor 1340 and at least one memory 1330 coupled with or to the at least one processor 1340, the at least one processor 1340 and the at least one memory 1330 configured to perform various functions described herein.

In some examples, the at least one processor 1340 may include multiple processors and the at least one memory 1330 may include multiple memories. One or more of the multiple processors may be coupled with one or more of the multiple memories, which may, individually or collectively, be configured to perform various functions described herein. In some examples, the at least one processor 1340 may be a component of a processing system, which may refer to a system (such as a series) of machines, circuitry (including, for example, one or both of processor circuitry (which may include the at least one processor 1340) and memory circuitry (which may include the at least one memory 1330)), or components, that receives or obtains inputs and processes the inputs to produce, generate, or obtain a set of outputs. The processing system may be configured to perform one or more of the functions described herein. For example, the at least one processor 1340 or a processing system including the at least one processor 1340 may be configured to, configurable to, or operable to cause the device 1305 to perform one or more of the functions described herein. Further, as described herein, being "configured to," being "configurable to," and being "operable to" may be used interchangeably and may be associated with a capability, when executing code 1335 (e.g., processor-executable code) stored in the at least one memory 1330 or otherwise, to perform one or more of the functions described herein.

The communications manager 1320 may support wireless communications in accordance with examples as disclosed herein. For example, the communications manager 1320 is capable of, configured to, or operable to support a means for generating a set of bits including a first set of multiple bits corresponding to a first set of REs allocated for data transmissions and a second set of multiple bits corresponding to a second set of REs allocated for DCRSs, where the first set of multiple bits corresponds to a first coding rate and a first modulation order and the second set of multiple bits corresponds to the first coding rate and a second modulation order that is lower than the first modulation order. The communications manager 1320 is capable of, configured to, or operable to support a means for writing the set if bits including the first set of multiple bits and the second set of multiple bits into a bitstream in accordance with an interleaving table, where one or more most significant bits are located in a first subset of rows of the interleaving table and one or more less significant bits are located in a second subset of rows of the interleaving table. The communications manager 1320 is capable of, configured to, or operable to support a means for mapping the first set of multiple bits of the bitstream to a set of multiple constellation points and the second set of multiple bits of the bitstream to a subset of the set of multiple constellation points in accordance with the interleaving table, where a quantity of the set of multiple constellation points is in accordance with the first modulation order, and a quantity of the subset of the set of multiple constellation points is in accordance with the second modulation order. The communications manager 1320 is capable of, configured to, or operable to support a means for transmitting the bitstream based on the mapping.

Additionally, or alternatively, the communications manager 1320 may support wireless communications in accordance with examples as disclosed herein. For example, the communications manager 1320 is capable of, configured to, or operable to support a means for generating a set of bits including a first set of multiple bits corresponding to a first set of REs allocated for data transmissions and a second set of multiple bits corresponding to a second set of REs allocated for data-carrying reference signals, where the first set of multiple bits corresponds to a first coding rate and a first modulation order and the second set of multiple bits corresponds to the first coding rate and a second modulation order that is lower than the first modulation order. The communications manager 1320 is capable of, configured to, or operable to support a means for writing the set if bits including the first set of multiple bits and the second set of multiple bits into a bitstream in accordance with an interleaving table, where the second set of multiple bits are located in a first subset of rows of the interleaving table corresponding to most significant bits, and one or more entries in the interleaving table of a second subset of rows corresponding to least significant bits of the second set of REs are unoccupied. The communications manager 1320 is capable of, configured to, or operable to support a means for mapping the bitstream to a set of multiple constellation points in accordance with the interleaving table, where a quantity of the set of multiple constellation points is in accordance with the first modulation order. The communications manager 1320 is capable of, configured to, or operable to support a means for transmitting the bitstream based on the mapping.

Additionally, or alternatively, the communications manager 1320 may support wireless communications in accordance with examples as disclosed herein. For example, the communications manager 1320 is capable of, configured to, or operable to support a means for receiving control signaling indicating a first interleaving table and a second interleaving table, the first interleaving table including a first quantity of rows corresponding to a first modulation order, and the second interleaving table including a second quantity of rows corresponding to a second modulation order. The communications manager 1320 is capable of, configured to, or operable to support a means for generating a set of bits including a first set of multiple bits corresponding to a first set of REs allocated for data transmissions and a second set of multiple bits corresponding to a second set of REs allocated for data-carrying reference signals, where the first set of multiple bits corresponds to a first coding rate and the first modulation order and the second set of multiple bits corresponds to the first coding rate and the second modulation order that is lower than the first modulation order. The communications manager 1320 is capable of, configured to, or operable to support a means for writing the set if bits including the first set of multiple bits into a bitstream in accordance with the first interleaving table, and the second set of multiple bits into the bitstream in accordance with the second interleaving table. The communications manager 1320 is capable of, configured to, or operable to support a means for transmitting the bitstream in accordance with the writing.

By including or configuring the communications manager 1320 in accordance with examples as described herein, the device 1305 may support techniques for bit interleaving of modulation symbol mapping for DCRSs resulting in more efficient use of system resources, increased reliability of wireless signaling, improved coordination between devices, and more efficient use of communication resources.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the at least one processor 1340, the at least one memory 1330, the code 1335, or any combination thereof. For example, the code 1335 may include instructions executable by the at least one processor 1340 to cause the device 1305 to perform various aspects of bit interleaving of modulation symbol mapping for DCRSs as described herein, or the at least one processor 1340 and the at least one memory 1330 may be otherwise configured to, individually or collectively, perform or support such operations.

Figure 14:
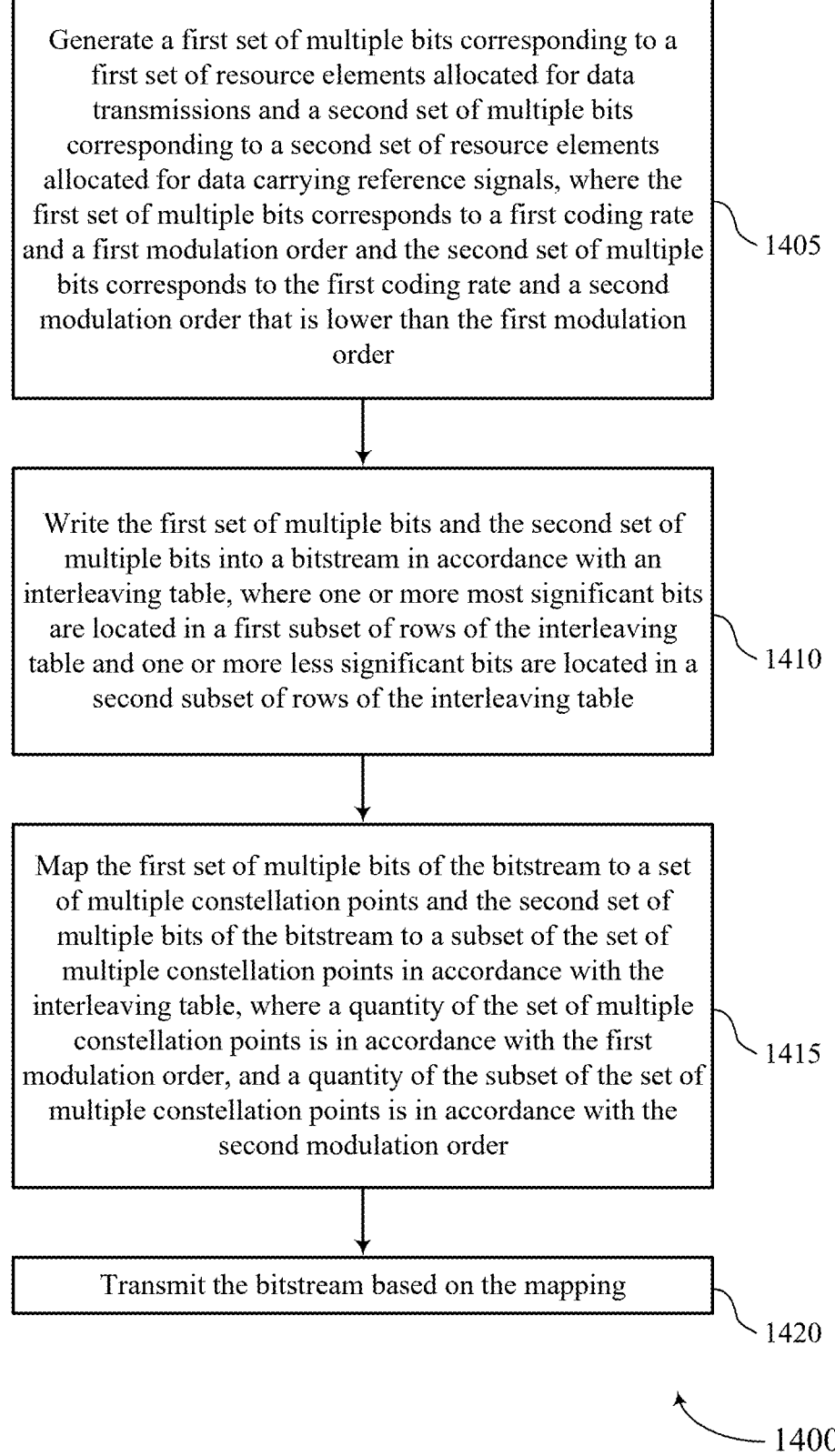

FIG. 14 shows a flowchart illustrating a method 1400 that supports bit interleaving of modulation symbol mapping for DCRSs in accordance with one or more aspects of the present disclosure. The operations of the method 1400 may be implemented by a UE or its components as described herein. For example, the operations of the method 1400 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1405, the method may include generating a set of bits including a first set of multiple bits corresponding to a first set of REs allocated for data transmissions and a second set of multiple bits corresponding to a second set of REs allocated for DCRSs, where the first set of multiple bits corresponds to a first coding rate and a first modulation order and the second set of multiple bits corresponds to the first coding rate and a second modulation order that is lower than the first modulation order. The operations of 1405 may be performed in accordance with examples as disclosed herein. In some examples, aspects of the operations of 1405 may be performed by a bitstream manager 1225 as described with reference to FIG. 12.

At 1410, the method may include writing the set if bits including the first set of multiple bits and the second set of multiple bits into a bitstream in accordance with an interleaving table, where one or more most significant bits are located in a first subset of rows of the interleaving table and one or more less significant bits are located in a second subset of rows of the interleaving table. The operations of 1410 may be performed in accordance with examples as disclosed herein. In some examples, aspects of the operations of 1410 may be performed by a bitstream manager 1225 as described with reference to FIG. 12.

At 1415, the method may include mapping the first set of multiple bits of the bitstream to a set of multiple constellation points and the second set of multiple bits of the bitstream to a subset of the set of multiple constellation points in accordance with the interleaving table, where a quantity of the set of multiple constellation points is in accordance with the first modulation order, and a quantity of the subset of the set of multiple constellation points is in accordance with the second modulation order. The operations of 1415 may be performed in accordance with examples as disclosed herein. In some examples, aspects of the operations of 1415 may be performed by a constellation mapping manager 1230 as described with reference to FIG. 12.

At 1420, the method may include transmitting the bitstream based on the mapping. The operations of 1420 may be performed in accordance with examples as disclosed herein. In some examples, aspects of the operations of 1420 may be performed by a data transmission manager 1235 as described with reference to FIG. 12.

FIG. 15 shows a flowchart illustrating a method 1500 that supports bit interleaving of modulation symbol mapping for DCRSs in accordance with one or more aspects of the present disclosure. The operations of the method 1500 may be implemented by a UE or its components as described herein. For example, the operations of the method 1500 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1505, the method may include generating a set of bits including a first set of multiple bits corresponding to a first set of REs allocated for data transmissions and a second set of multiple bits corresponding to a second set of REs allocated for data-carrying reference signals, where the first set of multiple bits corresponds to a first coding rate and a first modulation order and the second set of multiple bits corresponds to the first coding rate and a second modulation order that is lower than the first modulation order. The operations of 1505 may be performed in accordance with examples as disclosed herein. In some examples, aspects of the operations of 1505 may be performed by a bitstream manager 1225 as described with reference to FIG. 12.

At 1510, the method may include writing the set if bits including the first set of multiple bits and the second set of multiple bits into a bitstream in accordance with an interleaving table, where the second set of multiple bits are located in a first subset of rows of the interleaving table corresponding to most significant bits, and one or more entries in the interleaving table of a second subset of rows corresponding to least significant bits of the second set of REs are unoccupied. The operations of 1510 may be performed in accordance with examples as disclosed herein. In some examples, aspects of the operations of 1510 may be performed by a bitstream manager 1225 as described with reference to FIG. 12.

At 1515, the method may include mapping the bitstream to a set of multiple constellation points in accordance with the interleaving table, where a quantity of the set of multiple constellation points is in accordance with the first modulation order. The operations of 1515 may be performed in accordance with examples as disclosed herein. In some examples, aspects of the operations of 1515 may be performed by a constellation mapping manager 1230 as described with reference to FIG. 12.

At 1520, the method may include transmitting the bitstream based on the mapping. The operations of 1520 may be performed in accordance with examples as disclosed herein. In some examples, aspects of the operations of 1520 may be performed by a data transmission manager 1235 as described with reference to FIG. 12.

FIG. 16 shows a flowchart illustrating a method 1600 that supports bit interleaving of modulation symbol mapping for DCRSs in accordance with one or more aspects of the present disclosure. The operations of the method 1600 may be implemented by a UE or its components as described herein. For example, the operations of the method 1600 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1605, the method may include receiving control signaling indicating a first interleaving table and a second interleaving table, the first interleaving table including a first quantity of rows corresponding to a first modulation order, and the second interleaving table including a second quantity of rows corresponding to a second modulation order. The operations of 1605 may be performed in accordance with examples as disclosed herein. In some examples, aspects of the operations of 1605 may be performed by an interleaving table manager 1240 as described with reference to FIG. 12.

At 1610, the method may include generating a set of bits including a first set of multiple bits corresponding to a first set of REs allocated for data transmissions and a second set of multiple bits corresponding to a second set of REs allocated for data-carrying reference signals, where the first set of multiple bits corresponds to a first coding rate and the first modulation order and the second set of multiple bits corresponds to the first coding rate and the second modulation order that is lower than the first modulation order. The operations of 1610 may be performed in accordance with examples as disclosed herein. In some examples, aspects of the operations of 1610 may be performed by a bitstream manager 1225 as described with reference to FIG. 12.

At 1615, the method may include writing the set if bits including the first set of multiple bits into a bitstream in accordance with the first interleaving table, and the second set of multiple bits into the bitstream in accordance with the second interleaving table. The operations of 1615 may be performed in accordance with examples as disclosed herein. In some examples, aspects of the operations of 1615 may be performed by an interleaving table manager 1240 as described with reference to FIG. 12.

At 1620, the method may include transmitting the bitstream in accordance with the writing. The operations of 1620 may be performed in accordance with examples as disclosed herein. In some examples, aspects of the operations of 1620 may be performed by a data transmission manager 1235 as described with reference to FIG. 12.

The following provides an overview of aspects of the present disclosure:

Aspect 1: A method for wireless communications at a wireless device, comprising: generating a set of bits comprising a first plurality of bits corresponding to a first set of resource elements allocated for data transmissions and a second plurality of bits corresponding to a second set of resource elements allocated for DCRSs, wherein the first plurality of bits corresponds to a first coding rate and a first modulation order and the second plurality of bits corresponds to the first coding rate and a second modulation order that is lower than the first modulation order; writing the set of bits comprising the first plurality of bits and the second plurality of bits into a bitstream in accordance with an interleaving table, wherein one or more most significant bits are located in a first subset of rows of the interleaving table and one or more less significant bits are located in a second subset of rows of the interleaving table; mapping the first plurality of bits of the bitstream to a plurality of constellation points and the second plurality of bits of the bitstream to a subset of the plurality of constellation points in accordance with the interleaving table, wherein a quantity of the plurality of constellation points is in accordance with the first modulation order, and a quantity of the subset of the plurality of constellation points is in accordance with the second modulation order; and transmitting the bitstream based at least in part on the mapping.

Aspect 2: The method of aspect 1, further comprising: selecting the one or more most significant bits for the second set of resource elements to carry data for the DCRSs; and selecting one or more padding bits as the one or more least significant bits for the second set of resource elements, wherein the one or more padding bits correspond to a threshold Euclidean distance with respect to the subset of the plurality of constellation points.

Aspect 3: The method of any of aspects 1 through 2, further comprising: selecting the first subset of the plurality of constellation points from a set of candidate sub-constellations, each sub-constellation of comprising a respective portion of constellation points of the plurality of constellation points.

Aspect 4: The method of aspect 3, wherein each sub-constellation corresponding to a subset of the second set of resource elements, and selecting the first subset of the plurality of constellation points is based at least in part on an allocated subset of the second set of resource elements.

Aspect 5: The method of any of aspects 3 through 4, further comprising: receiving control signaling indicating a first sub-constellation of the set of candidate sub-constellations, wherein selecting the first subset of the plurality of constellation points is based at least in part on the control signaling.

Aspect 6: The method of any of aspects 3 through 5, wherein each sub-constellation of the set of candidate sub-constellations corresponds to a respective set of padded bits for each DCRS.

Aspect 7: The method of any of aspects 1 through 6, wherein the interleaving table comprises a systematic bit priority mapping interleaver.

Aspect 8: A method for wireless communications at a wireless device, comprising: generating a first plurality of bits corresponding to a first set of resource elements allocated for data transmissions and a second plurality of bits corresponding to a second set of resource elements allocated for data-carrying reference signals, wherein the first plurality of bits corresponds to a first coding rate and a first modulation order and the second plurality of bits corresponds to the first coding rate and a second modulation order that is lower than the first modulation order; writing the first plurality of bits and the second plurality of bits into a bitstream in accordance with an interleaving table, wherein the second plurality of bits are located in a first subset of rows of the interleaving table corresponding to most significant bits, and one or more entries in the interleaving table of a second subset of rows corresponding to least significant bits of the second set of resource elements are unoccupied; mapping the bitstream to a plurality of constellation points in accordance with the interleaving table, wherein a quantity of the plurality of constellation points is in accordance with the first modulation order; and transmitting the bitstream based at least in part on the mapping.

Aspect 9: The method of aspect 8, wherein writing the second plurality of bits into the bitstream comprises: writing the second plurality of bits into a first column of the interleaving table, wherein the first subset of rows corresponding to the most significant bits of the first column are occupied by the second plurality of bits, and wherein the second subset of rows corresponding to the least significant bits of the first column are unoccupied.

Aspect 10: The method of any of aspects 8 through 9, wherein a quantity of rows of the interleaving table is equal to the first modulation order.

Aspect 11: The method of any of aspects 8 through 10, further comprising: receiving control signaling comprising an instruction to write the first plurality of bits and the second plurality of bits according to the interleaving table, and to skip one or more entries of the interleaving table corresponding to the least significant bits of the second set of resource elements.

Aspect 12: The method of any of aspects 8 through 11, wherein the interleaving table comprises a systematic bit priority mapping interleaver.

Aspect 13: A method for wireless communications at a wireless device, comprising: receiving control signaling indicating a first interleaving table and a second interleaving table, the first interleaving table comprising a first quantity of rows corresponding to a first modulation order, and the second interleaving table comprising a second quantity of rows corresponding to a second modulation order; generating a first plurality of bits corresponding to a first set of resource elements allocated for data transmissions and a second plurality of bits corresponding to a second set of resource elements allocated for data-carrying reference signals, wherein the first plurality of bits corresponds to a first coding rate and the first modulation order and the second plurality of bits corresponds to the first coding rate and the second modulation order that is lower than the first modulation order; writing the first plurality of bits into a bitstream in accordance with the first interleaving table, and the second plurality of bits into the bitstream in accordance with the second interleaving table; and transmitting the bitstream in accordance with the writing.

Aspect 14: The method of aspect 13, further comprising: mapping the first plurality of bits of the bitstream to a first plurality of constellation points in accordance with the first interleaving table, wherein a quantity of the first plurality of constellation points is in accordance with the first modulation order; and mapping the second plurality of bits of the bitstream to a second plurality of constellation points in accordance with the second interleaving table and the second modulation order, wherein a quantity of the second plurality of constellation points is in accordance with the second modulation order.

Aspect 15: The method of aspect 14, wherein transmitting the bitstream is based at least in part on mapping the first plurality of bits of the bitstream to the first plurality of constellation points, and mapping the second plurality of bits of the bitstream to the second plurality of constellation points.

Aspect 16: The method of any of aspects 13 through 15, wherein the first interleaving table comprises a first systematic bit priority mapping interleaver, and the second interleaving table comprises a second systematic bit priority mapping interleaver.

Aspect 17: A wireless device for wireless communications, comprising one or more memories storing processor-executable code, and one or more processors coupled with the one or more memories and individually or collectively operable to execute the code to cause the wireless device to perform a method of any of aspects 1 through 7.

Aspect 18: A wireless device for wireless communications, comprising at least one means for performing a method of any of aspects 1 through 7.

Aspect 19: A non-transitory computer-readable medium storing code for wireless communications, the code comprising instructions executable by one or more processors to perform a method of any of aspects 1 through 7.

Aspect 20: A wireless device for wireless communications, comprising one or more memories storing processor-executable code, and one or more processors coupled with the one or more memories and individually or collectively operable to execute the code to cause the wireless device to perform a method of any of aspects 8 through 12.

Aspect 21: A wireless device for wireless communications, comprising at least one means for performing a method of any of aspects 8 through 12.

Aspect 22: A non-transitory computer-readable medium storing code for wireless communications, the code comprising instructions executable by one or more processors to perform a method of any of aspects 8 through 12.

Aspect 23: A wireless device for wireless communications, comprising one or more memories storing processor-executable code, and one or more processors coupled with the one or more memories and individually or collectively operable to execute the code to cause the wireless device to perform a method of any of aspects 13 through 16.

Aspect 24: A wireless device for wireless communications, comprising at least one means for performing a method of any of aspects 13 through 16.

Aspect 25: A non-transitory computer-readable medium storing code for wireless communications, the code comprising instructions executable by one or more processors to perform a method of any of aspects 13 through 16.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A wireless device, comprising:
one or more memories storing processor-executable code; and
one or more processors coupled with the one or more memories and individually or collectively operable to execute the code to cause the wireless device to:
generate a set of bits comprising a first plurality of bits corresponding to a first set of resource elements allocated for data transmissions and a second plurality of bits corresponding to a second set of resource elements allocated for data carrying reference signals, wherein the first plurality of bits corresponds to a first coding rate and a first modulation order and the second plurality of bits corresponds to the first coding rate and a second modulation order that is lower than the first modulation order;
write the set of bits comprising the first plurality of bits and the second plurality of bits into a bitstream in accordance with an interleaving table, wherein one or more most significant bits are located in a first subset of rows of the interleaving table and one or more less significant bits are located in a second subset of rows of the interleaving table;
map the first plurality of bits of the bitstream to a plurality of constellation points and the second plurality of bits of the bitstream to a subset of the plurality of constellation points in accordance with the interleaving table, wherein a quantity of the plurality of constellation points is in accordance with the first modulation order, and a quantity of the subset of the plurality of constellation points is in accordance with the second modulation order; and
transmit the bitstream based at least in part on the mapping.

2. The wireless device of claim 1, wherein the one or more processors are individually or collectively further operable to execute the code to cause the wireless device to:
select the one or more most significant bits for the second set of resource elements to carry data for the data carrying reference signals; and
select one or more padding bits as the one or more least significant bits for the second set of resource elements, wherein the one or more padding bits correspond to a threshold Euclidean distance with respect to the subset of the plurality of constellation points.

3. The wireless device of claim 1, wherein the one or more processors are individually or collectively further operable to execute the code to cause the wireless device to:
select the first subset of the plurality of constellation points from a set of candidate sub-constellations, each sub-constellation of comprising a respective portion of constellation points of the plurality of constellation points.

4. The wireless device of claim 3, wherein:
each sub-constellation corresponding to a subset of the second set of resource elements, and
selecting the first subset of the plurality of constellation points is based at least in part on an allocated subset of the second set of resource elements.

5. The wireless device of claim 3, wherein the one or more processors are individually or collectively further operable to execute the code to cause the wireless device to:
receive control signaling indicating a first sub-constellation of the set of candidate sub-constellations, wherein selecting the first subset of the plurality of constellation points is based at least in part on the control signaling.

6. The wireless device of claim 3, wherein:
each sub-constellation of the set of candidate sub-constellations corresponds to a respective set of padded bits for each data carrying reference signal.

7. The wireless device of claim 1, wherein the interleaving table comprises a systematic bit priority mapping interleaver.

8. A wireless device, comprising:
one or more memories storing processor-executable code; and
one or more processors coupled with the one or more memories and individually or collectively operable to execute the code to cause the wireless device to:
generate a first plurality of bits corresponding to a first set of resource elements allocated for data transmissions and a second plurality of bits corresponding to a second set of resource elements allocated for data-carrying reference signals, wherein the first plurality of bits corresponds to a first coding rate and a first modulation order and the second plurality of bits corresponds to the first coding rate and a second modulation order that is lower than the first modulation order;
write the first plurality of bits and the second plurality of bits into a bitstream in accordance with an interleaving table, wherein the second plurality of bits are located in a first subset of rows of the interleaving table corresponding to most significant bits, and one or more entries in the interleaving table of a second subset of rows corresponding to least significant bits of the second set of resource elements are unoccupied;
map the bitstream to a plurality of constellation points in accordance with the interleaving table, wherein a quantity of the plurality of constellation points is in accordance with the first modulation order; and
transmit the bitstream based at least in part on the mapping.

9. The wireless device of claim 8, wherein, to write the second plurality of bits into the bitstream, the one or more processors are individually or collectively operable to execute the code to cause the wireless device to:
write the second plurality of bits into a first column of the interleaving table, wherein the first subset of rows corresponding to the most significant bits of the first column are occupied by the second plurality of bits, and wherein the second subset of rows corresponding to the least significant bits of the first column are unoccupied.

10. The wireless device of claim 8, wherein a quantity of rows of the interleaving table is equal to the first modulation order.

11. The wireless device of claim 8, wherein the one or more processors are individually or collectively further operable to execute the code to cause the wireless device to:
receive control signaling comprising an instruction to write the first plurality of bits and the second plurality of bits according to the interleaving table, and to skip one or more entries of the interleaving table corresponding to the least significant bits of the second set of resource elements.

12. The wireless device of claim 8, wherein the interleaving table comprises a systematic bit priority mapping interleaver.

13. A wireless device, comprising:

one or more memories storing processor-executable code; and one or more processors coupled with the one or more memories and individually or collectively operable to execute the code to cause the wireless device to:

receive control signaling indicating a first interleaving table and a second interleaving table, the first interleaving table comprising a first quantity of rows corresponding to a first modulation order, and the second interleaving table comprising a second quantity of rows corresponding to a second modulation order;

generate a first plurality of bits corresponding to a first set of resource elements allocated for data transmissions and a second plurality of bits corresponding to a second set of resource elements allocated for data-carrying reference signals, wherein the first plurality of bits corresponds to a first coding rate and the first modulation order and the second plurality of bits corresponds to the first coding rate and the second modulation order that is lower than the first modulation order;

write the first plurality of bits into a bitstream in accordance with the first interleaving table, and the second plurality of bits into the bitstream in accordance with the second interleaving table; and transmit the bitstream in accordance with the writing.

14. The wireless device of claim 13, wherein the one or more processors are individually or collectively further operable to execute the code to cause the wireless device to:

map the first plurality of bits of the bitstream to a first plurality of constellation points in accordance with the first interleaving table, wherein a quantity of the first plurality of constellation points is in accordance with the first modulation order; and map the second plurality of bits of the bitstream to a second plurality of constellation points in accordance with the second interleaving table and the second modulation order, wherein a quantity of the second plurality of constellation points is in accordance with the second modulation order.

15. The wireless device of claim 14, wherein transmitting the bitstream is based at least in part on mapping the first plurality of bits of the bitstream to the first plurality of constellation points, and mapping the second plurality of bits of the bitstream to the second plurality of constellation points.

16. The wireless device of claim 13, wherein:

the first interleaving table comprises a first systematic bit priority mapping interleaver, and the second interleaving table comprises a second systematic bit priority mapping interleaver.

17. A method for wireless communications at a wireless device, comprising:

generating a set of bits comprising a first plurality of bits corresponding to a first set of resource elements allocated for data transmissions and a second plurality of bits corresponding to a second set of resource elements allocated for data carrying reference signals, wherein the first plurality of bits corresponds to a first coding rate and a first modulation order and the second plurality of bits corresponds to the first coding rate and a second modulation order that is lower than the first modulation order;

writing the set of bits comprising the first plurality of bits and the second plurality of bits into a bitstream in accordance with an interleaving table, wherein one or more most significant bits are located in a first subset of rows of the interleaving table and one or more less significant bits are located in a second subset of rows of the interleaving table;

mapping the first plurality of bits of the bitstream to a plurality of constellation points and the second plurality of bits of the bitstream to a subset of the plurality of constellation points in accordance with the interleaving table, wherein a quantity of the plurality of constellation points is in accordance with the first modulation order, and a quantity of the subset of the plurality of constellation points is in accordance with the second modulation order; and transmitting the bitstream based at least in part on the mapping.

18. The method of claim 17, further comprising:

selecting the one or more most significant bits for the second set of resource elements to carry data for the data carrying reference signals; and selecting one or more padding bits as the one or more least significant bits for the second set of resource elements, wherein the one or more padding bits correspond to a threshold Euclidean distance with respect to the subset of the plurality of constellation points.

19. The method of claim 17, further comprising:

selecting the first subset of the plurality of constellation points from a set of candidate sub-constellations, each sub-constellation of comprising a respective portion of constellation points of the plurality of constellation points.

20. The method of claim 19, wherein:

each sub-constellation corresponding to a subset of the second set of resource elements, and selecting the first subset of the plurality of constellation points is based at least in part on an allocated subset of the second set of resource elements.

21. The method of claim 19, further comprising:

receiving control signaling indicating a first sub-constellation of the set of candidate sub-constellations, wherein selecting the first subset of the plurality of constellation points is based at least in part on the control signaling.

22. The method of claim 19, wherein each sub-constellation of the set of candidate sub-constellations corresponds to a respective set of padded bits for each data carrying reference signal.

23. The method of claim 17, wherein the interleaving table comprises a systematic bit priority mapping interleaver.

\* \* \* \* \*